United States Patent [19]

Yamaguchi et al.

[11] Patent Number: 5,552,217
[45] Date of Patent: Sep. 3, 1996

[54] MAGNETIC RECORDING MEDIUM AND A METHOD FOR PRODUCING IT

[75] Inventors: Kiyoto Yamaguchi; Hisashi Yamasaki; Yoshifumi Matsui, all of Kawasaki, Japan

[73] Assignee: Fuji Electric Co., Ltd., Kawasaki, Japan

[21] Appl. No.: 74,720

[22] Filed: Jun. 10, 1993

Related U.S. Application Data

[63] Continuation of Ser. No. 595,591, Oct. 11, 1990, abandoned.

[30] Foreign Application Priority Data

Oct. 20, 1989 [JP] Japan ................................ 1-273207
Dec. 25, 1989 [JP] Japan ................................ 1-336060
Feb. 23, 1990 [JP] Japan ................................ 2-43063

[51] Int. Cl.$^6$ .............................. G11B 5/66; B32B 5/16
[52] U.S. Cl. .......................... 428/332; 428/336; 428/611; 428/678; 428/694 T; 428/694 TS; 428/694 TP; 428/900
[58] Field of Search ........................ 428/611, 678, 428/900, 694 T, 694 TS, 694 TP, 332, 336

[56] References Cited

U.S. PATENT DOCUMENTS

| | | | |
|---|---|---|---|
| 4,769,282 | 9/1988 | Tada | 428/694 |
| 4,789,598 | 12/1988 | Howard et al. | 428/408 |
| 4,833,044 | 5/1989 | Takahashi | 428/694 |
| 4,840,845 | 6/1989 | Tamai | 428/694 |
| 4,883,711 | 11/1989 | Shiroishi | 428/611 |
| 4,929,514 | 5/1990 | Natarajan et al. | 428/611 |
| 4,939,046 | 7/1990 | Yazawa | 428/678 |
| 4,950,548 | 8/1990 | Furusawa | 478/678 |
| 5,004,652 | 4/1991 | Lai | 428/611 |
| 5,024,903 | 6/1991 | Mizukami | 428/694 TS |
| 5,024,904 | 6/1991 | Mizukami | 428/694 |

FOREIGN PATENT DOCUMENTS 63-79233 4/1988 Japan .
63-79234 4/1988 Japan .
1256017 10/1989 Japan .

*Primary Examiner*—Leszek Kiliman
*Attorney, Agent, or Firm*—Spencer & Frank

[57] ABSTRACT

A magnetic recording medium includes a non-magnetic metal primary layer and a thin ferromagnetic alloy layer which are sequentially formed on a non-magnetic substrate in a laminated manner by sputtering. The thin ferromagnetic alloy layer is composed of not more than 15 at % of chromium, not more than 12 at % of platinum, 0.15 to 5.4 at % of a metal element selected from the group consisting of tantalum, hafnium, tungsten, zirconium and niobium, and the balance cobalt. The magnetic recording medium has a coercive force of higher than 1500 Oe and a squareness ratio of higher than 0.85.

11 Claims, 18 Drawing Sheets

MAGNETIC RECORDING MEDIUM AND A METHOD FOR PRODUCING IT

This application is a continuation, of application Ser. No. 07/595,591, filed Oct. 11, 1990, now abandoned.

BACKGROUND OF THE INVENTION

1. Field of the Invention

The present invention relates to a magnetic recording medium for use in a magnetic recording device, such as a magnetic tape device or magnetic disc device, and also to a method of producing such a magnetic recording medium.

2. Description of the Prior Art

Recently, magnetic disc devices have been extensively used as external memory devices for information processing devices such as computers. FIG. 1 shows a schematic cross-sectional view of a conventional magnetic recording medium for use in such a magnetic disc device, disclosed in Japanese Patent Application Laying-Open Nos. 63-79233 and 6379234. The magnetic recording medium shown in FIG. 1 comprises a substrate 1 composed of a non-magnetic substrate plate 11 and a non-magnetic metal layer 12 formed thereon, and further a primary layer 2 of non-magnetic metal, a thin-film magnetic layer 3 of a ferromagnetic alloy, and a protective layer 4 of amorphous carbon are laminated on the substrate 1. Further, a lubricant layer 5 made of a liquid lubricant is formed on the protective layer 4.

This conventional recording medium is produced according to the following procedure. Namely, the non-magnetic metal layer 12 of a Ni—P alloy is formed by electroless plating on the non-magnetic substrate plate 11 made, for example, of an Al alloy and finished to predetermined parallelism, flatness and surface roughness. Then, the surface of the layer 12 is polished so that the non-magnetic substrate 1 has a predetermined surface roughness. The non-magnetic substrate 1 is heated to 200° C., and the non-magnetic metal primary layer 2 of Cr having a thickness of 3000 Å, the magnetic layer 3 of Co—Ni—Cr alloy (Ni:30%; Cr:7.5%) having a thickness of 500 Å, and the protective layer 4 of amorphous carbon having a thickness of 200 Å are sequentially formed on the surface of the substrate 1 in a laminated manner by a sputtering process. Further, a fluorocarbon-type liquid lubricant is coated on the protective layer 4 to form the lubricant layer 5 having a thickness of 20 Å. The recording medium thus formed has mechanical characteristics such as strength and dimensional accuracies good enough not to invite any trouble in practical use. The magnetic characteristics of this medium are also good, and more specifically the coercive force Hc is about 1000 Oe, and the squareness ratio Br/Bs is about 0.80 to about 0.85.

U.S. Pat. No. 4,789,598 discloses a vertical recording-type magnetic recording disc in which a primary layer of chromium, a vertical magnetic anisotropic layer of Co—Pt—Cr alloy containing not less than 17% of Cr, and a protective layer are sequentially formed on an aluminum substrate having a surface layer of NiP.

However, recently, the requirements for mass-processing of information have increased and diversified, and it has strongly been desired that magnetic disc devices should have high recording densities and large capacities. Therefore, it has been necessary to provide a magnetic recording medium which has a higher coercive force Hc and a high squareness ratio Br/Bs commensurate with a thin-film magnetic head used for achieving a high recording density. In magnetic tape devices, it has also been desired to achieve such a high-recording density design.

SUMMARY OF THE INVENTION

This invention has been made in view of the foregoing, and an object of the present invention is to provide a magnetic recording medium which has a higher coercive force and a high squareness ratio.

Another object of the present invention is to provide a method of producing a magnetic recording medium of the type in which crystal grains of a magnetic layer are very fine, and the axis of easy magnetization can easily be directed in the plane of the recording medium, so that the magnetic recording medium can have a high coercive force and a high squareness ratio suitable for a high recording density design.

In accordance with a first aspect of the present invention, a magnetic recording medium comprises:

a non-magnetic substrate;

a non-magnetic metal primary layer formed on the substrate;

a thin ferromagnetic alloy layer formed on the primary layer; and a protective layer formed on the ferromagnetic alloy layer;

wherein the ferromagnetic alloy layer is composed of not more than 15 at % of chromium, 6 to 18 at % of platinum and the balance cobalt.

Here, the primary layer may be made of chromium or titanium and may have a thickness of 700 to 3500 Å and the thin ferromagnetic alloy may have a thickness of not less than 300 Å.

In accordance with a second aspect of the present invention, a magnetic recording medium comprises:

a non-magnetic substrate;

a non-magnetic metal primary layer formed on the substrate;

a thin ferromagnetic alloy layer formed on the primary layer; and a protective layer formed on the ferromagnetic alloy layer;

wherein the thin ferromagnetic alloy layer is made of an alloy composed of not more than 15 at % of chromium, not more than 12 at % of platinum, 0.15 to 5.4 at % of a metal element selected from the group consisting of tantalum, hafnium, tungsten, zirconium and niobium, and the balance cobalt.

Here, the metal element may be tantalum and the content of tantalum may be in within a range from 0.2 to 3.0 at %.

The non-magnetic metal primary layer may be made of chromium or titanium, and may have a thickness of 500 to 3000 Å, and the thin ferromagnetic alloy layer may have a thickness of 300 to 700 Å.

The metal element may be hafnium, and the content of hafnium may be within a range from 0.3 to 4.7 at %.

The non-magnetic metal primary layer may be made of chromium or titanium, and may have a thickness of 500 to 3400 Å, and the thin ferromagnetic alloy layer may have a thickness of 250 to 800 Å.

The metal element may be tungsten, the content of tungsten may be within a range from 0.15 to 3.5 at %.

The non-magnetic metal primary layer may be made of chromium or titanium, and may have a thickness of 500 to 3000 Å, and the thin ferromagnetic alloy layer may have a thickness of 250 to 800 Å.

The metal element may be zirconium, and the content of zirconium may be within a range from 0.3 to 5.4 at %.

The non-magnetic metal primary layer may be made of chromium or titanium, and may have a thickness of to 3500 Å, and the thin ferromagnetic alloy layer may have a thickness of 250 to 750 Å.

The metal element may be niobium, and the content of niobium may be within a range from 0.25 to 4.8 at %.

The non-magnetic metal primary layer may be made of chromium or titanium, and may have a thickness of 500 Å to 3000 Å, and the thin ferromagnetic alloy layer may have a thickness of 250 to 850 Å.

In accordance with a third aspect of the present invention, a method for producing a magnetic recording medium comprises the steps of:

heating a non-magnetic substrate to 160° to 270° C;

sputtering a non-magnetic metal target to form a primary layer on the substrate;

sputtering a ferromagnetic alloy target to form a thin ferromagnetic alloy layer containing at least cobalt, chromium and platinum on the primary layer; and forming a protective layer on the thin ferromagnetic alloy layer.

The above and other objects, effects, features and advantages of the present invention will become more apparent from the following description of embodiments thereof taken in conjunction with the accompanying drawings.

DETAILED DESCRIPTION OF PREFERRED EMBODIMENTS

EXAMPLE 1

Figure 1:
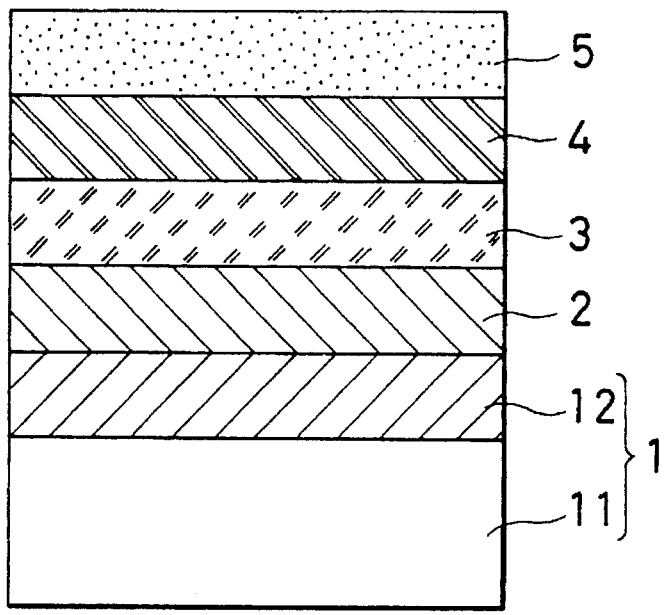
FIG. 1 is a schematic cross-sectional view of a conventional magnetic recording medium.
Figure 2:
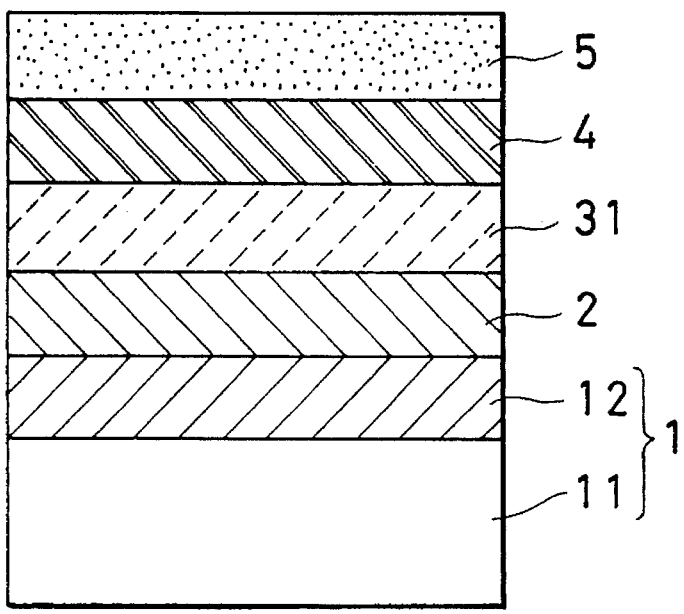
FIG. 2 is a schematic cross-sectional view of an example of the magnetic recording medium of the present invention.

FIG. 2 is a schematic cross-sectional view of a magnetic recording medium in accordance with the present invention provided in the form of a magnetic disc.

The magnetic recording medium shown in FIG. 2 comprises a non-magnetic substrate 1 composed of a non-magnetic substrate plate 11 and a non-magnetic metal-plated surface layer 12 formed on the substrate plate 11, and further comprises a non-magnetic primary layer 2, a magnetic layer 31 of Co—Cr—Pt alloy, and a protective layer 4 sequentially deposited on the non-magnetic substrate 1 by sputtering. Further, a lubricant layer 5 is coated on the protective layer 4. This magnetic recording medium was produced according to the following procedure. First, an aluminum alloy plate was machined or worked into a disc having predetermined inner and outer diameters, and the surface of the disc-shaped plate thus formed was cut to provide the substrate 11, which is disc-shaped. Then, the non-magnetic metal layer 12 of a nickel-phosphorus alloy containing 11 to 13 at % of phosphorus was formed on the surface of the substrate plate 11 by electroless plating. Then, the surface of the layer 12 was subjected to superfine surface polishing to provide such surface roughness that the center-line mean roughness Ra (defined in Japanese industrial standard JIS B 0601) was about 60 Å. Thereafter, in order to prevent a head from adhering when the disc is in a stationary condition, circumferential grooves were formed in the surface to texture it. The thus obtained substrate 1 was subjected to precision washing, and was set in a holder, and the holder and the substrate 1 were introduced into a charge chamber of an in-line type magnetron sputtering apparatus. Then, the charge chamber was evacuated to a pressure of $5 \times 10^{-6}$ Torr or less, and the substrate was heated at 200° C. for 5 minutes. Then, the holder holding the substrate was transferred to a film-forming chamber, and within this chamber, the non-magnetic metal primary layer 2 made of chromium having a thickness of 200 to 4000 Å), the magnetic layer 31 of Co—Cr—Pt alloy, and the protective layer 4 (made of amorphous carbon having a thickness of 200 Å) were sequentially formed on the substrate by sputtering at a pressure of 5 mTorr in an atmosphere of argon gas. In the deposition of the magnetic layer 31, magnetic layers of different compositions were produced, using targets having respective platinum plates of different areas embedded in Co(85 at %)—Cr(15 at %) alloy. The composition of the magnetic layer 31 is represented by $(Co_{85}Cr_{15})_{100-x}Pt_x$. In the formation of the protective layer 4 of amorphous carbon, a graphite target was used. After the sputtering deposition of the non-magnetic primary layer 2, the magnetic layer 31 and the protective layer 4 on the substrate 1 was finished, the holder holding the substrate was transferred to a removal chamber, and then the substrate was removed from the holder at atmospheric pressure. Then, a fluorocarbon-type liquid lubricant was coated on the surface of the protective layer 4 of amorphous carbon to form the lubricant layer 5 (having a thickness of 20 Å). Thus, the magnetic recording media were prepared.

Figure 3:
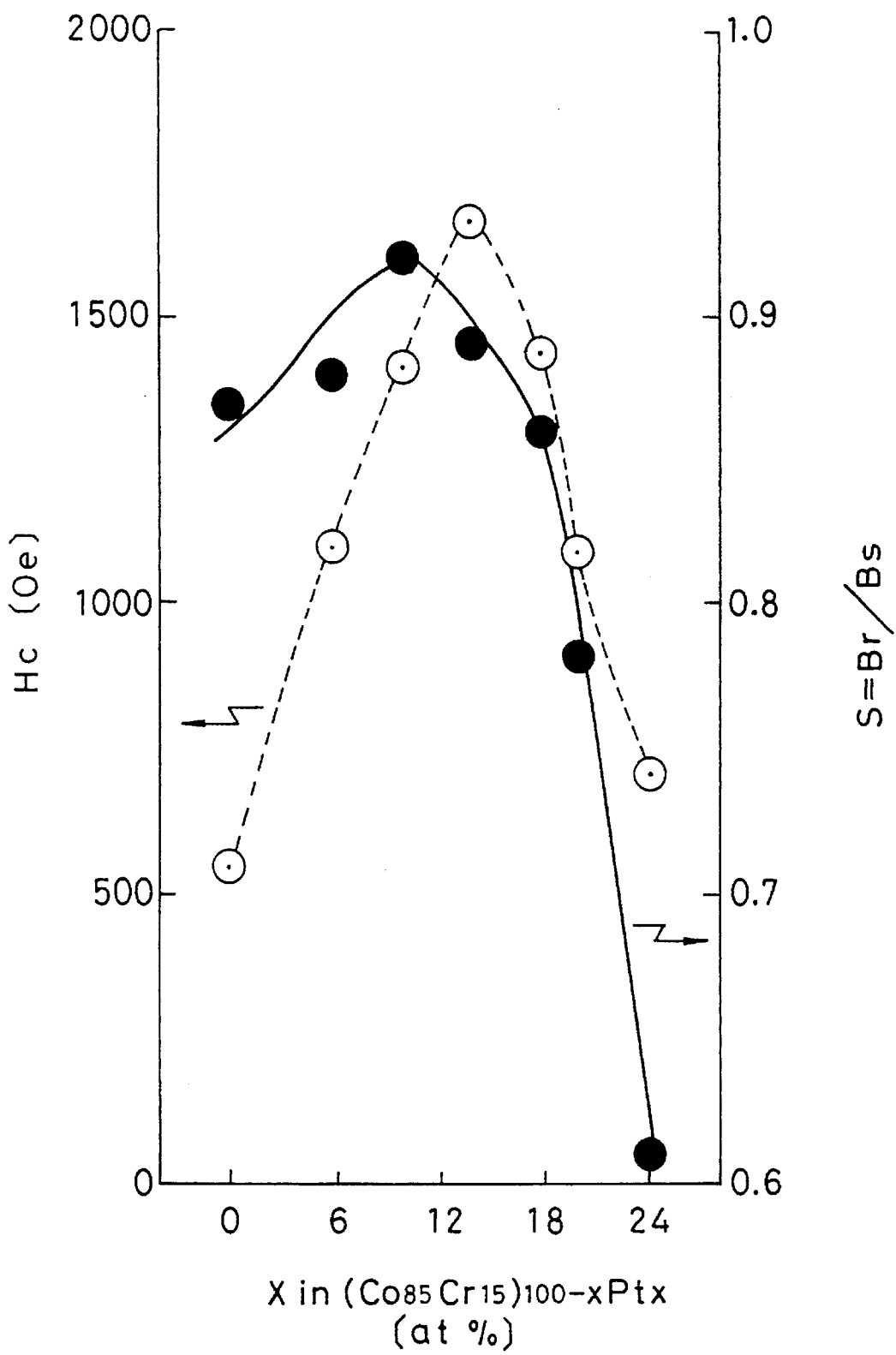
FIG. 3 is a diagram showing the relationship between the magnetic characteristics of the first example of the magnetic recording medium of the present invention and the platinum content in a ferromagnetic alloy thin-film magnetic layer.

FIG. 3 shows the magnetic characteristics of the magnetic recording media, produced by varying the Pt content of the magnetic layer 31 represented by $(Co_{85}Cr_{15})_{100-x}Pt_x$. FIG. 3 is a diagram showing the coercive force Hc as well as the squareness ratio S =Br/Bs calculated from the ratio of the residual magnetic flux density Br to the saturation magnetic flux density Bs, when the thickness of the Cr non-magnetic primary layer 2 was 1500 Å, and the thickness of the Co—Cr—Pt magnetic layer 31 was 600 Å.

As the Pt content increased, the coercive force Hc was improved, and was at a maximum at 14 at % of Pt, and thereafter the coercive force decreased gradually. On the other hand, the squareness ratio S increased until it reached a peak at 10 at % of Pt, but thereafter the squareness ratio rapidly decreased. When the Pt content was in the range of 6 to 18 at %, a recording medium having a coercive force of 1000 Oe or higher and a squareness ratio S of 0.85 or higher was obtained, and such value are required for a high recording density medium.

Figure 4:
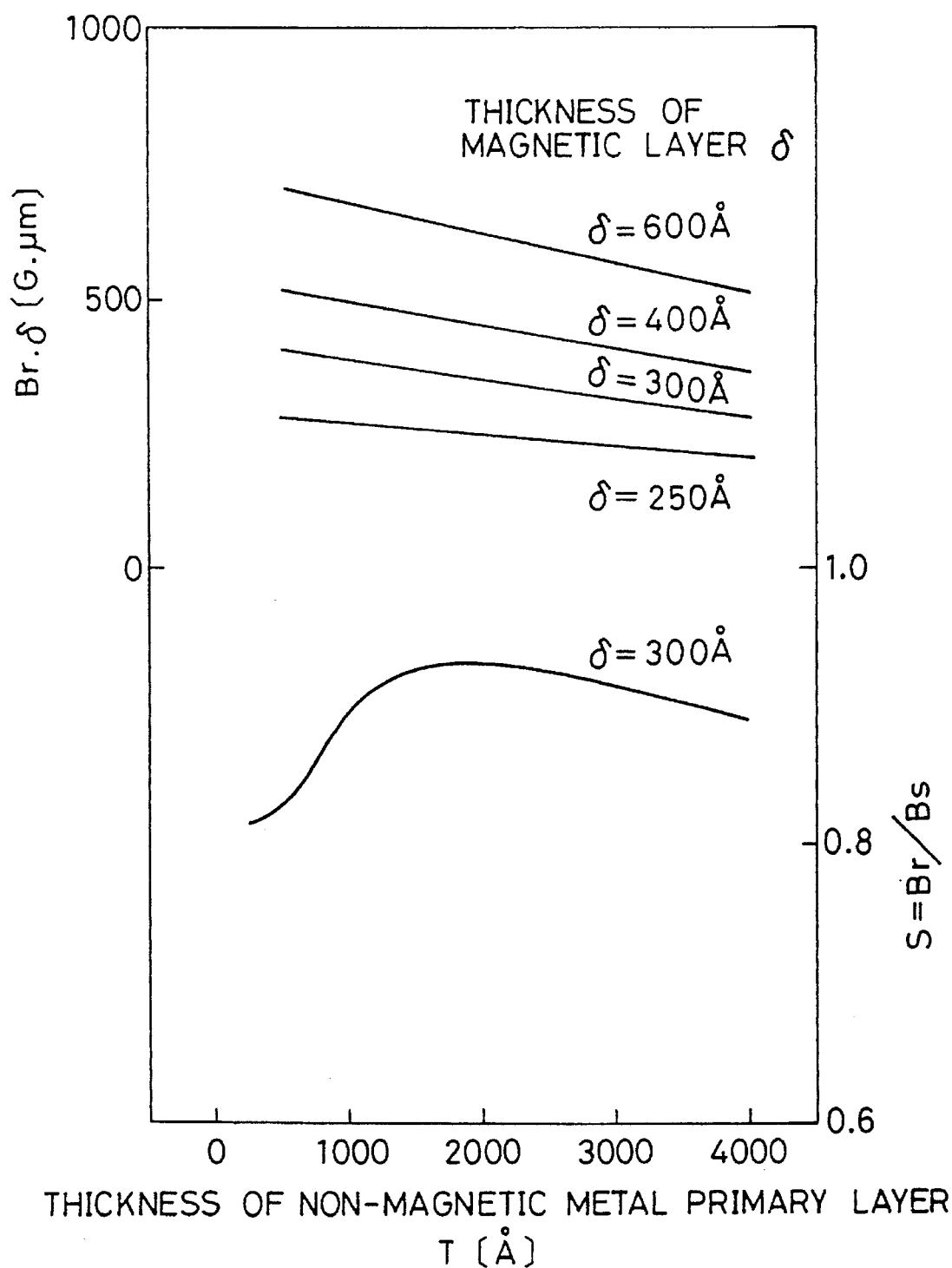
FIG. 4 is a diagram showing the relationship between the magnetic characteristics of the first example of the magnetic recording medium and the thickness of a non-magnetic metal primary layer using the thickness of the magnetic layer as a parameter.

FIG. 4 shows the magnetic characteristics of the magnetic recording media, produced by varying the thickness T of the Cr non-magnetic metal primary layer 2 in the range of 200 to 4000 Å and by varying the thickness δ of the Co—Cr—Pt magnetic layer 31 in the range of 250 to 600 Å. The composition ratio of the Co—Cr—Pt magnetic layer 31 used here is represented by Co:Cr:Pt=76.5:13.5:10. This composition is equal to the composition $(Co_{85}Cr_{15})_{90}Pt_{10}$ which exhibits the maximum squareness ratio in FIG. 3. The magnetic characteristics of the recording medium varied depending not only on the composition of the magnetic layer 31 but also on the thickness of the magnetic layer 31 and the thickness of the non-magnetic primary layer. The value of the product of the residual flux density Br and the thickness δ of the Co—Cr—Pt magnetic layer tended to decrease monotonically with an increase of the thickness T of the Cr primary layer. When the thickness T of the Cr layer was not more than 3500 Å, and at the same time when the thickness δ of the Co—Cr—Pt layer was not less than 300 Å, the Br·δ value of 300 G.μm or higher as required for a high recording density design was obtained. On the other hand, the squareness ratio S was the maximum when at a thickness T of the Cr layer was around 1750 Å, and this ratio S was 0.85 or higher when T was not less than 700 Å. Therefore, with respect to the ranges of the layer thicknesses to satisfy Br·δ of 300 G.μm or higher and S of 0.85 or higher, which are required for a high recording density medium, the Cr layer thickness T is 700 to 3500 Å, and the Co—Cr—Pt layer thickness δ is not less than 300 Å.

It has been confirmed by another test that the above magnetic characteristics show similar results when the non-magnetic metal primary layer 2 is made of titanium. Also, even when the protective layer is either made of other material (e.g., silicon dioxide), or is not provided, it has been confirmed that the above magnetic characteristics are not changed.

As described above, a magnetic recording medium including a non-magnetic metal primary layer that has a thickness of 700 to 3500 Å, and a ferromagnetic alloy thin-film magnetic layer (which is made of a alloy composed of not more than 15 at % of Cr, 6 to 18 at % of Pt and the balance Co) that is formed on the primary layer and that has a thickness of not less than 300 Å, can serve as a high recording density medium having a high coercive force of 1000 Oe or higher, the Br·δ value of 300 G.μm or higher and a high squareness ratio of 0.85 or higher.

EXAMPLE 2

A thin film of Co—Cr—Pt-Ta alloy was used as the magnetic layer 31 of the magnetic recording medium shown in FIG. 2. More specifically, using magnetic layer-forming targets having respective Ta pieces of different areas embedded in $Co_{73}Cr_{15}Pt_{12}$ alloy, a magnetic layer 31 whose composition was represented by $(Co_{73}Cr_{15}Pt_{12})_{100-x}Ta_x$ was formed on a non-magnetic primary layer 2 by sputtering. With respect to the Co—Cr—Pt ternary alloy, a $Co_{73}Cr_{15}Pt_{12}$ alloy has both a high coercive force Hc and a high squareness ratio S. Except that the alloy for the magnetic layer was changed, the procedure for preparing the magnetic recording medium was the same as in Example 1.

Figure 5:
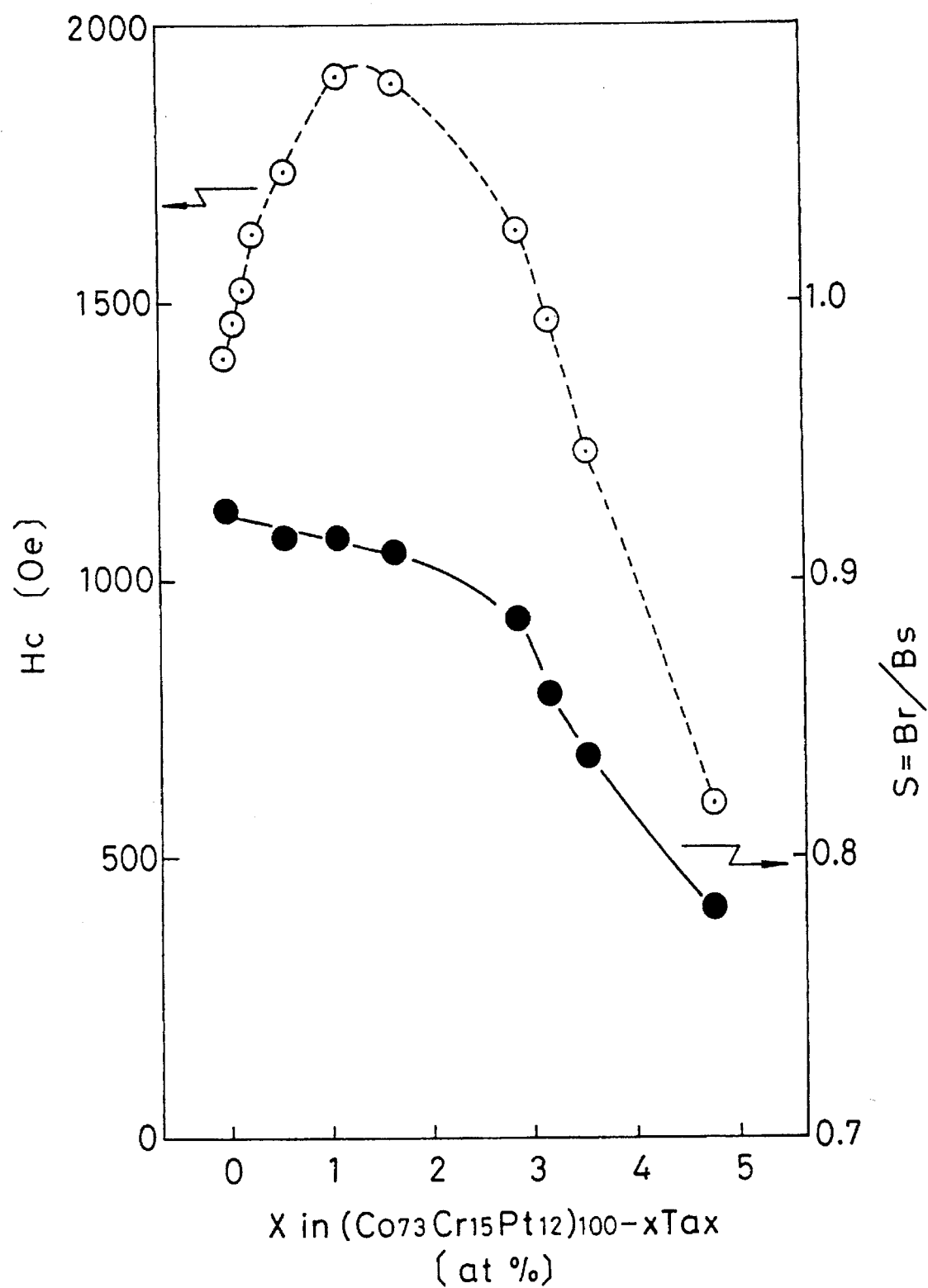
FIG. 5 is a diagram showing the relationship between the magnetic characteristics of a second example of the magnetic recording medium of the present invention and the tantalum content in a ferromagnetic alloy thin-film magnetic layer.

FIG. 5 shows the magnetic characteristics of the magnetic recording media, produced by varying the Ta content of the Co—Cr—Pt-Ta magnetic layer. FIG. 5 is a diagram showing the coercive force Hc and the squareness ratio S=Br/Bs, when the Cr non-magnetic primary layer 2 has a thickness of 1500 Å, and the Co—Cr—Pt—Ta magnetic layer has a thickness of 600 Å.

As the Ta content increased, the coercive force Hc was improved, and was the maximum at 1.3 at % of Ta, and thereafter the coercive force decreased abruptly. On the other hand, the squareness ratio S tended to decrease monotonically with an increase of the Ta content. When the Ta content was not more than 3.0 at %, a coercive force of higher than 1000 Oe and a squareness ratio of higher than 0.85 were obtained. Particularly when the Ta content was in the range of 0.2 to 3.0 at %, a high coercive force of higher than 1500 Oe was obtained.

Figure 6:
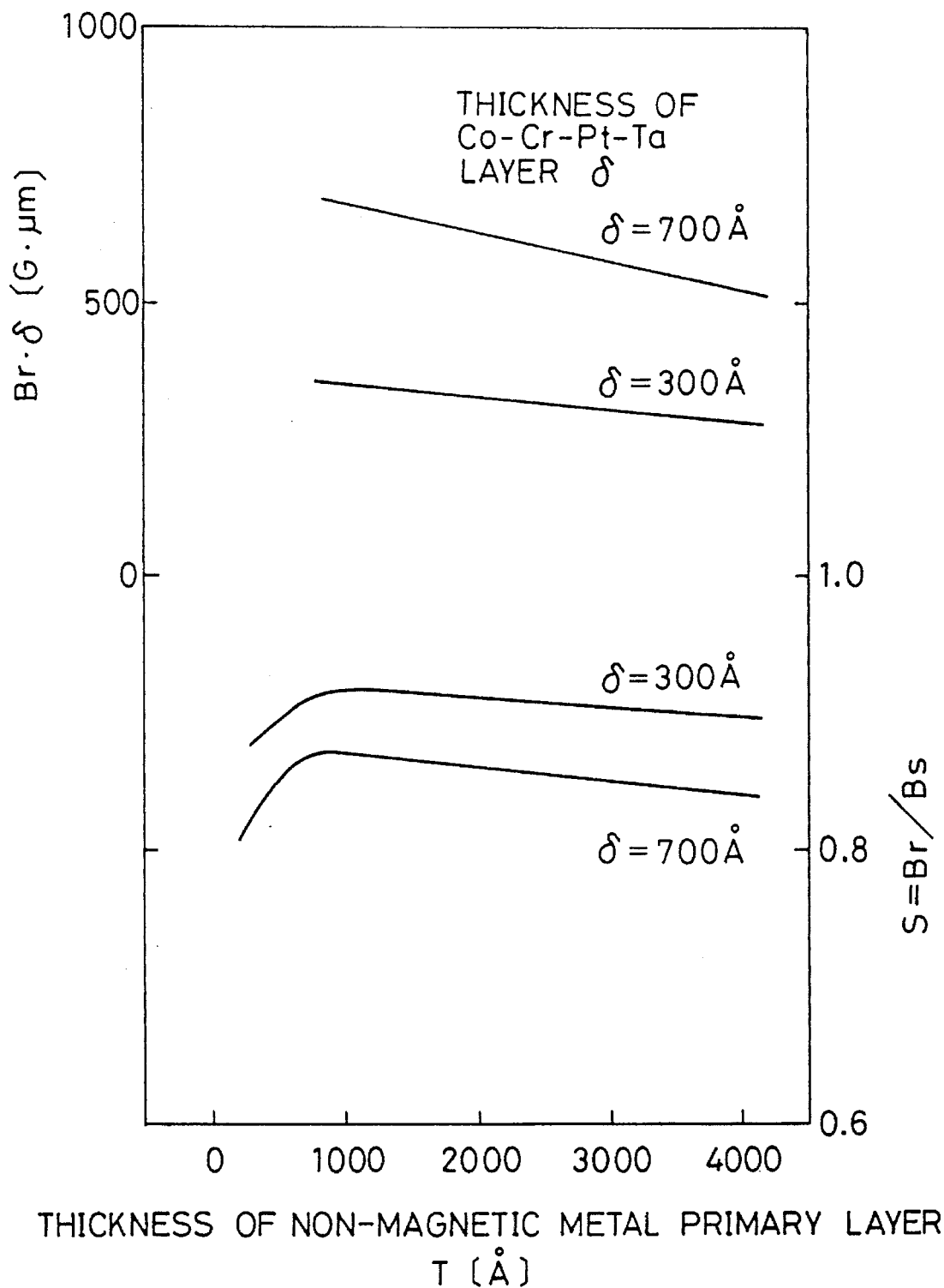
FIG. 6 is a diagram showing the relationship between the magnetic characteristics of the second example of the magnetic recording medium and the thickness of a non-magnetic metal primary layer using the thickness of the magnetic layer as a parameter.

FIG. 6 shows the magnetic characteristics of the magnetic recording media, produced by varying the thickness T of the Cr non-magnetic metal primary layer 2 and the thickness $\delta$ of the Co—Cr—Pt—Ta magnetic layer. The composition ratio of the Co—Cr—Pt—Ta magnetic layer used here is represented by Co:Cr:Pt:Ta=71.8:14.7:11.8:1.7. This composition corresponds to $(Co_{73}Cr_{15}Pt_{12})_{98.3}Ta_{1.7}$ which is like the composition having the maximum coercive force in FIG. 5. The value of the product of the residual flux density Br and the thickness $\delta$ of the magnetic layer tended to decrease monotonically with an increase of the thickness T of the Cr primary layer. When the thickness T of the Cr layer was not more than 3000 Å, and at the same time when the thickness $\delta$ of the Co—Cr—Pt—Ta layer was not less than 300 Å, a Br-$\delta$ value of higher than 300 G.μm as required for a high recording density design was obtained. On the other hand, the squareness ratio S was at a maximum when the thickness T of the Cr layer was around 800 Å. Further, the squareness ratio S decreased with an increase of the thickness of the Co—Cr—Pt—Ta layer. When the thickness T of the Cr layer was in the range of 500 to 3000 Å, and at the same time when the thickness $\delta$ of the Co—Cr—Pt—Ta layer was in the range of 300 to 700 Å, a magnetic recording medium having a coercive force of higher than 1500 Oe and a squareness ratio of higher than 0.85 was obtained.

It has earlier been mentioned that before the sputtering film formation, the substrate 1 is heated to 200° C., and then the sputtering film formation is carried out.

Figure 7:
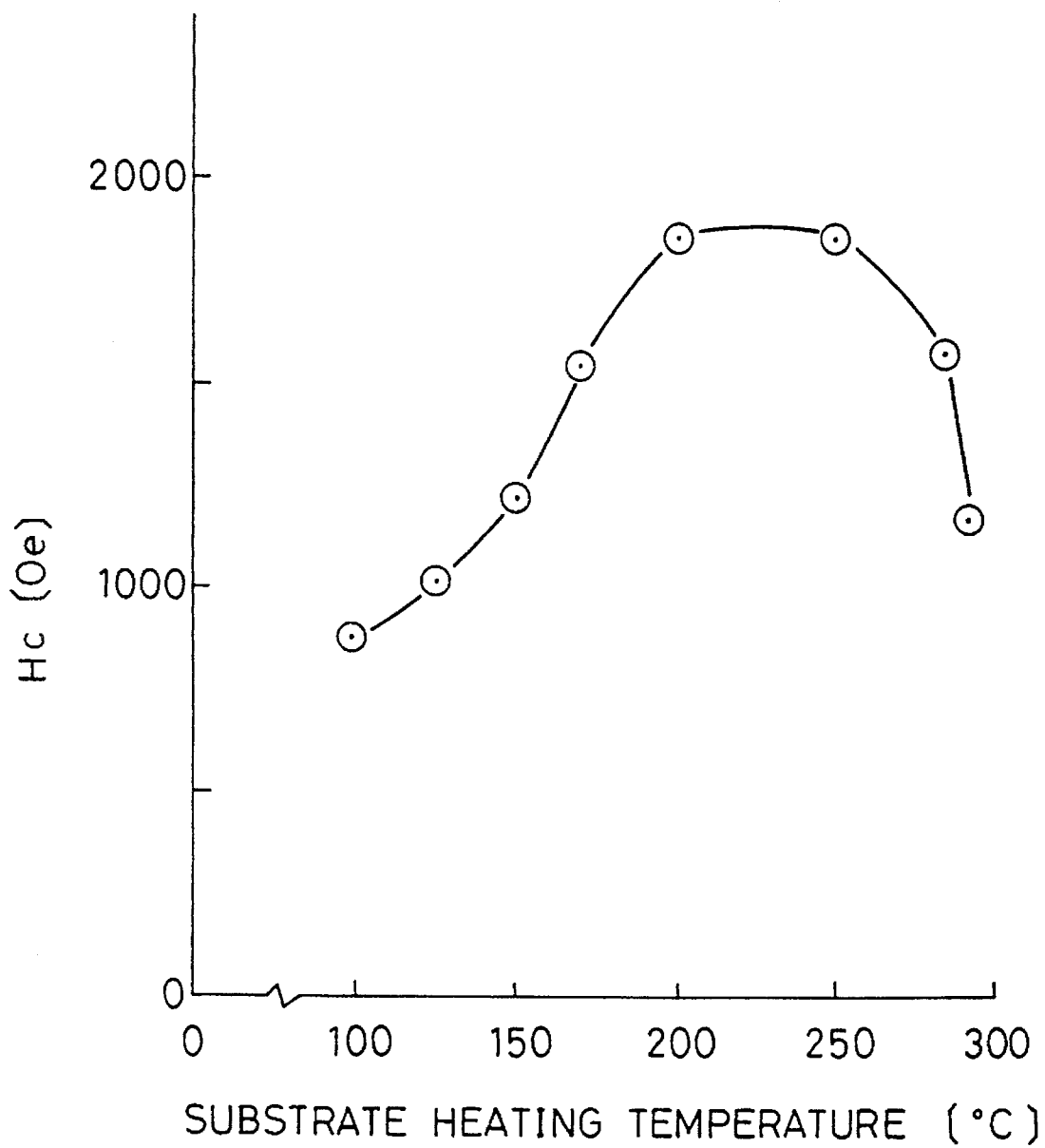
FIG. 7 is a diagram showing the relationship between the magnetic characteristics of the second example of the magnetic recording medium and the heating temperature of a substrate prior to a sputtering film formation process.

FIG. 7 shows variations in the coercive force when the temperature of heating of the substrate 1 prior to the sputtering film formation was changed. The thickness of the Cr primary layer 2 was 1500 Å, and the composition of the magnetic layer 31 was 71.8 at % of Co, 14.7 at % of Cr, 11.8 at % of Pt and 1.7 at % of Ta, and the thickness of the magnetic layer 31 was 600 Å. The time of heating of the substrate 1 was 5 minutes. When heat treatment was carried out to provide substrate temperatures of 170 to 270°C., and then the film formation was carried out, a magnetic recording medium having a coercive force of higher than 1500 Oe was obtained.

EXAMPLE 3

Instead of adding Ta to the Co—Cr—Pt ternary alloy as in Example 2, Hf was added to the ternary alloy, and a magnetic layer 31 was made of Hf containing alloy. More specifically, using targets having Hf pieces of different areas embedded in an alloy composed of 73 at % of Co, 15 at % of Cr and 12 at % of Pt, a magnetic layer whose composition was represented by $(Co_{73}Cr_{15}Pt_{12})_{100-x}Hf_x$ was formed on a Cr primary layer 2 by sputtering. Except for this step, magnetic recording media as shown in FIG. 2 were prepared according to the same procedure as Example 1 or Example 2.

Figure 8:
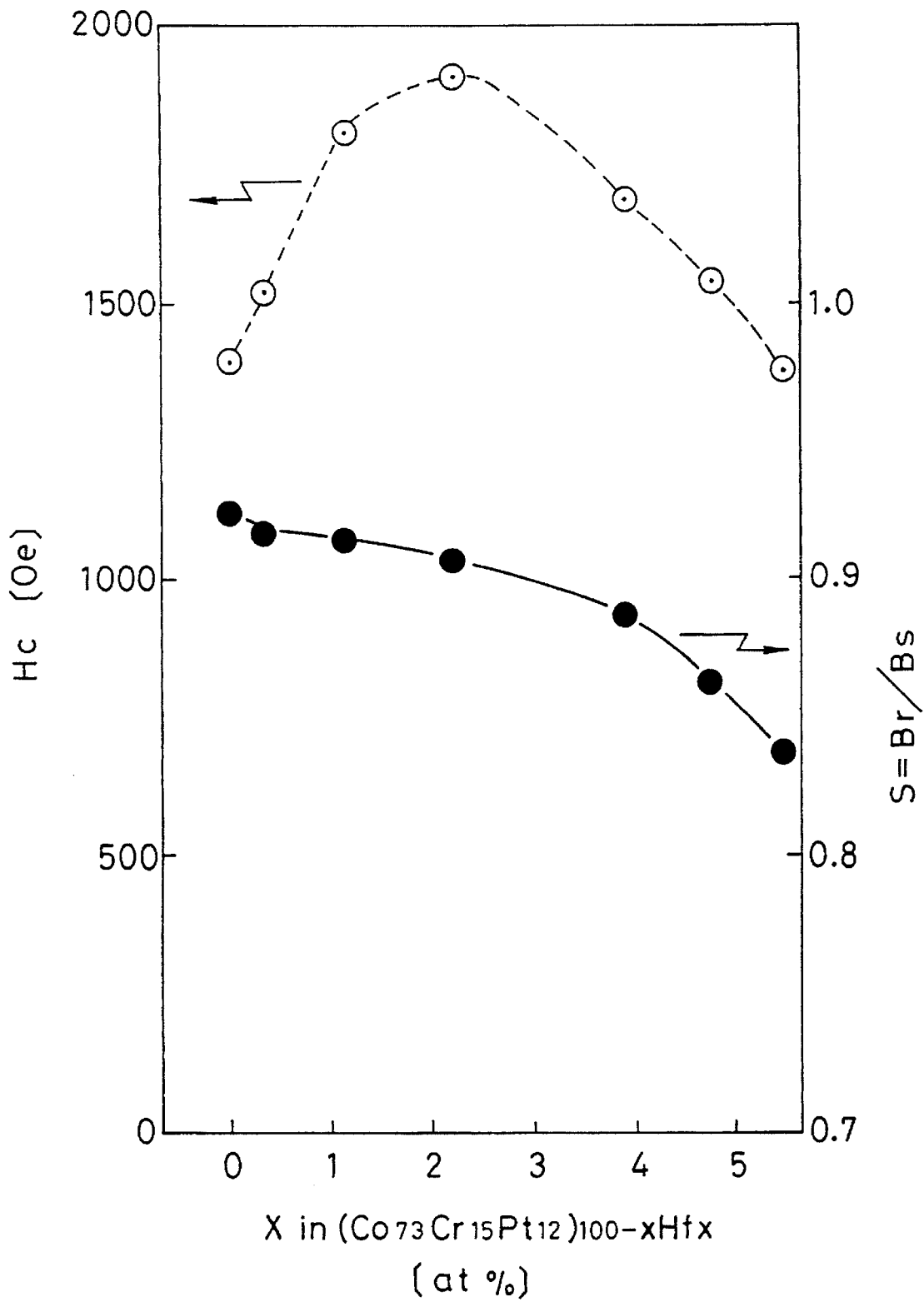
FIG. 8 is a diagram showing the relationship between the magnetic characteristics of a third example of the magnetic recording medium of the present invention and the hafnium content in a ferromagnetic alloy thin-film magnetic layer.

FIG. 8 shows the magnetic characteristics of the magnetic recording media, produced by varying the Hf content of the Co—Cr—Pt—Hf magnetic layer. FIG. 8 is a diagram showing the coercive force Hc and the squareness ratio S=Br/Bs, when the Cr non-magnetic primary layer 2 had a thickness of 1500 Å, and the Co—Cr—Pt—Hf magnetic layer had a thickness of 600 Å.

As the Hf content increased, the coercive force Hc was improved, and was at a maximum at 2.2 at % of Hf, and thereafter the coercive force decreased abruptly. On the other hand, the squareness ratio S tended to decrease monotonically with an increase of the Hf content. When the Hf content was not more than 5.0 at, a coercive force of higher than 1000 Oe and a squareness ratio of higher than 0.85 were obtained. Particularly when the Hf content was in the range of 0.3 to 4.7 at %, a high coercive force of higher than 1500 Oe was obtained.

Figure 9:
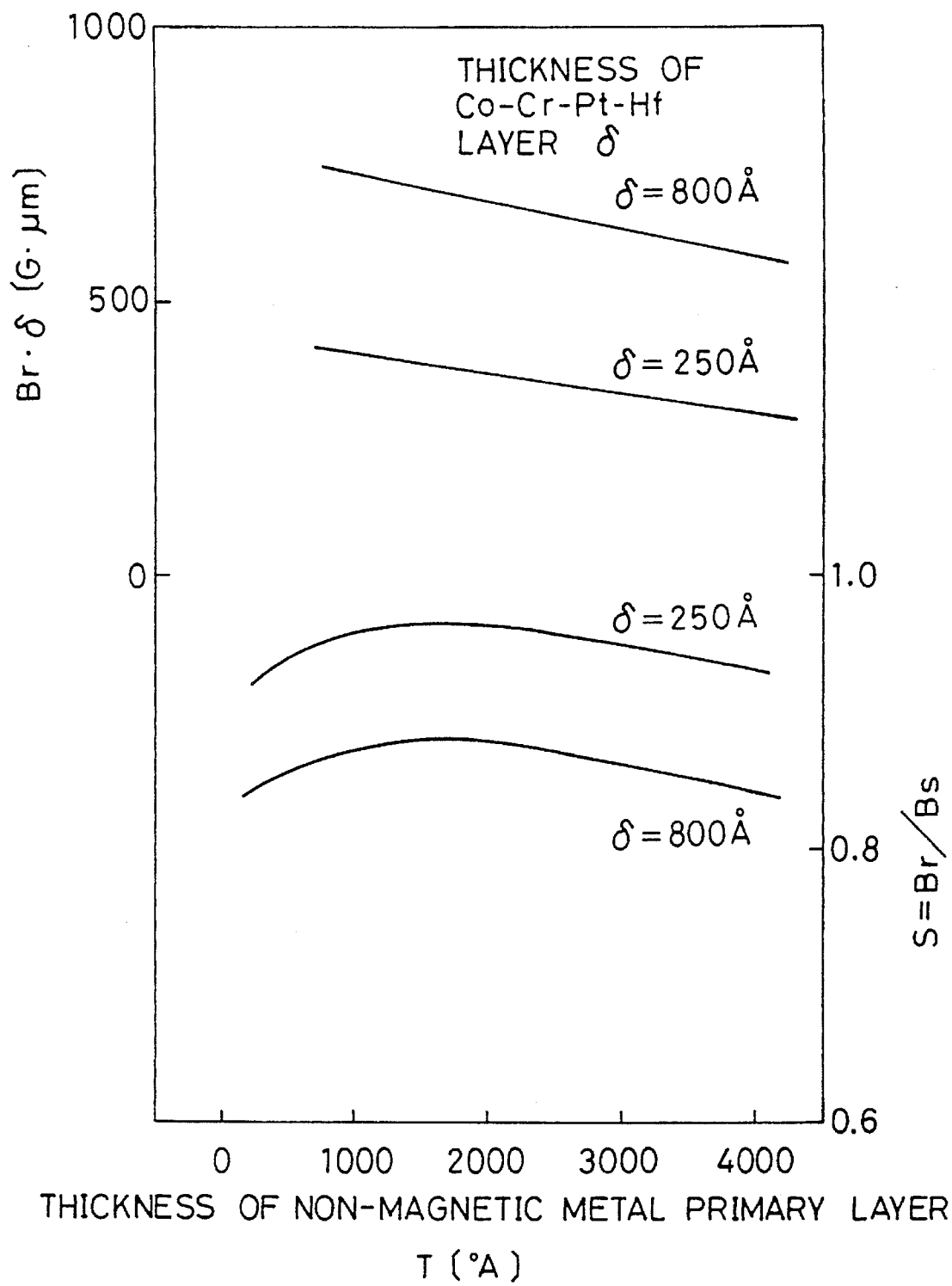
FIG. 9 is a diagram showing the relationship between the magnetic characteristics of the third example of the magnetic recording medium and the thickness of a non-magnetic metal primary layer using the thickness of the magnetic layer as a parameter.

FIG. 9 shows the magnetic characteristics of the magnetic recording media, produced by varying the thickness T of the Cr non-magnetic metal primary layer 2 and the thickness $\delta$ of the Co—Cr—Pt—Hf magnetic layer. The composition ratio of the Co—Cr—Pt—Hf magnetic layer used here is represented by Co:Cr:Pt:Hf=71.5:14.7:11.8:2.0. This composition corresponds to $(Co_{73}Cr_{15}Pt_{12})_{98.0}Hf_{2.0}$ which is like the composition having the maximum coercive force in FIG. 8. The value of the product of the residual flux density Br and the thickness $\delta$ of the magnetic layer tended to decrease monotonically with an increase of the thickness T of the Cr primary layer. When the thickness T of the Cr layer was not more than 3400 Å, and at the same time when the thickness $\delta$ of the Co—Cr—Pt—Hf layer was not less than 250 Å, a Br-$\delta$ value of higher than 300 G.μm required for a high recording density design was obtained. On the other hand, the squareness ratio S was at a maximum when the thickness T of the Cr layer was around 1500 Å. Further, the squareness ratio S decreased with an increase of the thickness $\delta$ of the Co—Cr—Pt—Hf layer. When the thickness T of the Cr layer was in the range of 500 to 3400 Å, and at the same time when the thickness $\delta$ of the Co—Cr—Pt—Hf layer was in the range of 250 to 800 Å, a magnetic recording medium having a coercive force of higher than 1500 Oe and a squareness ratio of higher than 0.85 was obtained.

Figure 10:
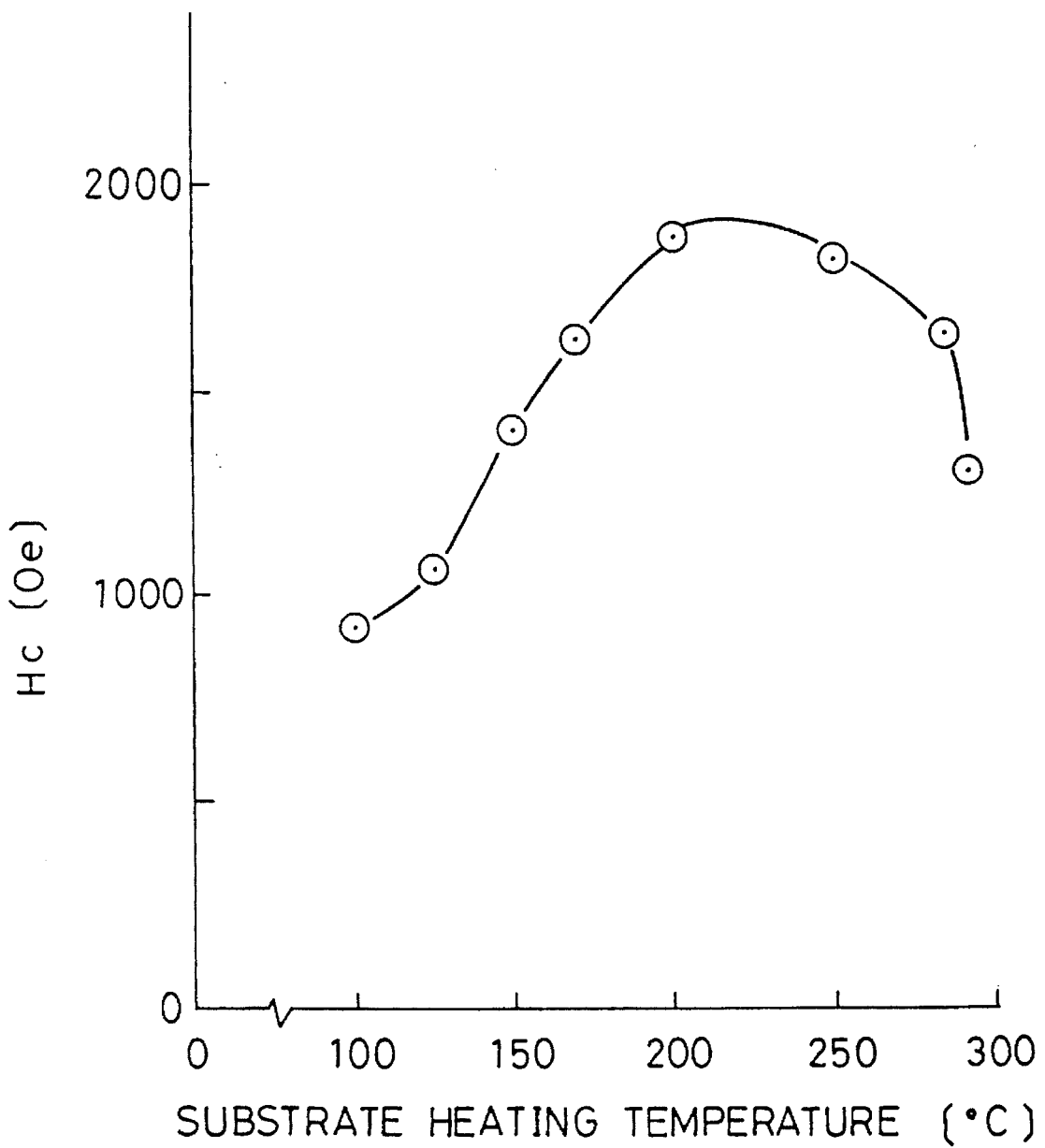
FIG. 10 is a diagram showing the relationship between the magnetic characteristics of the third example of the magnetic recording medium and the heating temperature of a substrate prior to a sputtering film formation process.

FIG. 10 shows variations in the coercive force when the temperature of heating of the substrate 1 prior to the sputtering film formation was changed. The thickness of the Cr primary layer 2 was 1500 Å, and the magnetic layer 31 was composed of 71.5 at % of Co, 14.7 at % of Cr, 11.8 at % of Pt and 2.0 at % of Hf, and the thickness of the magnetic layer 31 was 600 Å. The time of heating of the substrate 1 was 5 minutes. When heat treatment was carried out to provide substrate temperatures of 170° to 270° C., and then the film formation was carried out, a magnetic recording medium having a coercive force of higher than 1500 Oe was obtained.

EXAMPLE 4

Instead of adding Ta to the Co—Cr—Pt ternary alloy as in Example 2, W was added to the ternary alloy, and a magnetic layer 31 was made of W containing alloy. More specifically, using targets having W pieces of different areas embedded in an alloy composed of 73 at % of Co, 15 at % of Cr and 12 at % of Pt, a magnetic layer whose composition was represented by $(Co_{73}Cr_{15}Pt_{12})_{100-x}W_x$ was formed on a Cr primary layer 2 by sputtering. Except for this step, magnetic recording media as shown in FIG. 2 were prepared according to the same procedure as Example 1 or Example 2.

Figure 11:
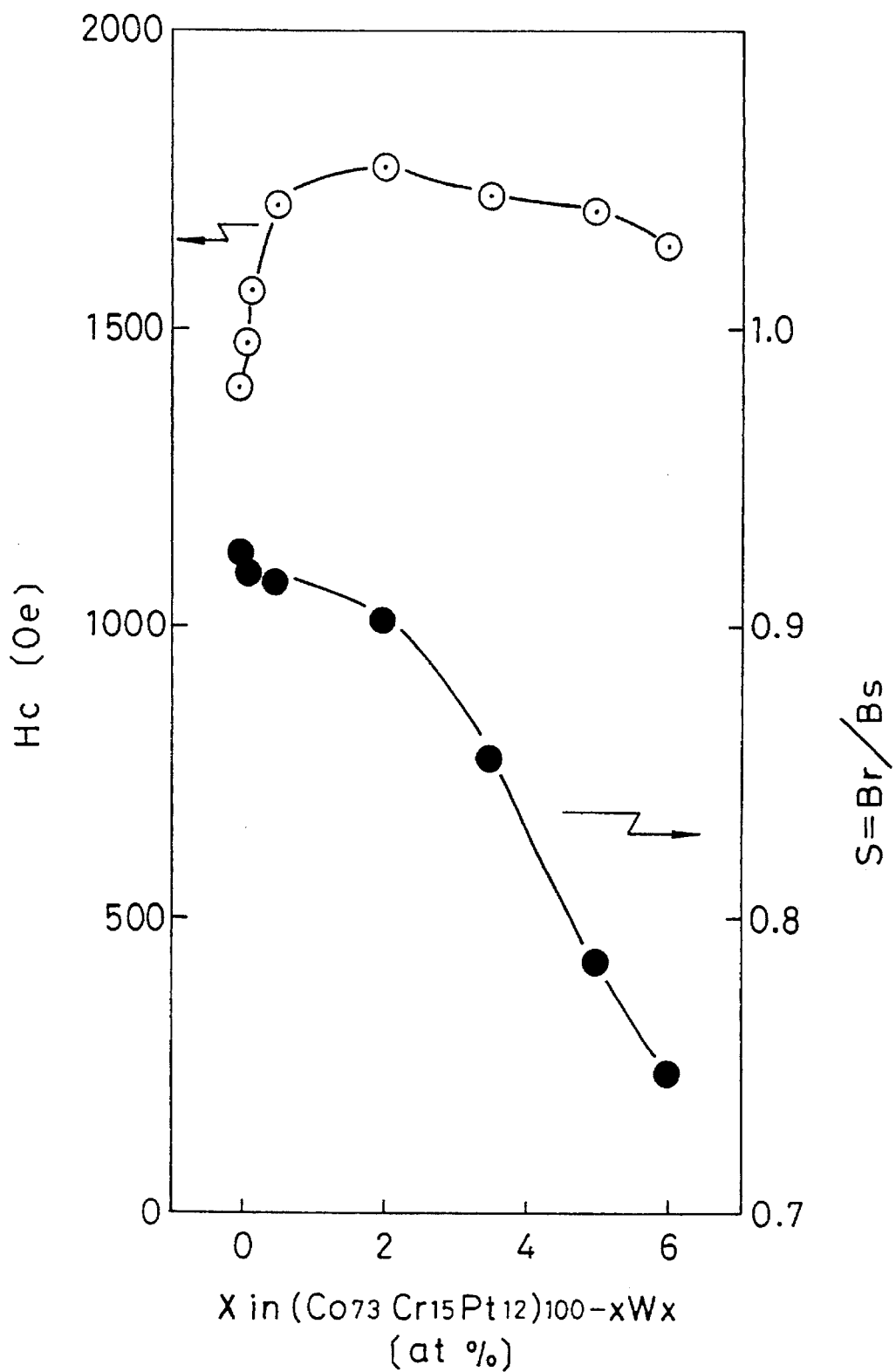
FIG. 11 is a diagram showing the relationship between the magnetic characteristics of a fourth example of the magnetic recording medium of the present invention and the tungsten content in a ferromagnetic alloy thin-film magnetic layer.

FIG. 11 shows the magnetic characteristics of the magnetic recording media, produced by varying the W content of the Co—Cr—Pt—W magnetic layer. FIG. 11 is a diagram showing the coercive force Hc and the squareness ratio S=Br/Bs, when the thickness of the Cr non-magnetic primary layer 2 was 1500 Å, and the thickness of the Co—Cr—Pt—W magnetic layer was 600 Å.

As the W content increased, the coercive force Hc was improved, and was at a maximum at 2.0 at % of W, and thereafter the coercive force decreased. On the other hand, the squareness ratio S tended to decrease monotonically with an increase of the W content. When the W content was in the range of 0.15 to 3.5 at %, a coercive force of higher than 1500 Oe and a squareness ratio of higher than 0.85 were obtained.

Figure 12:
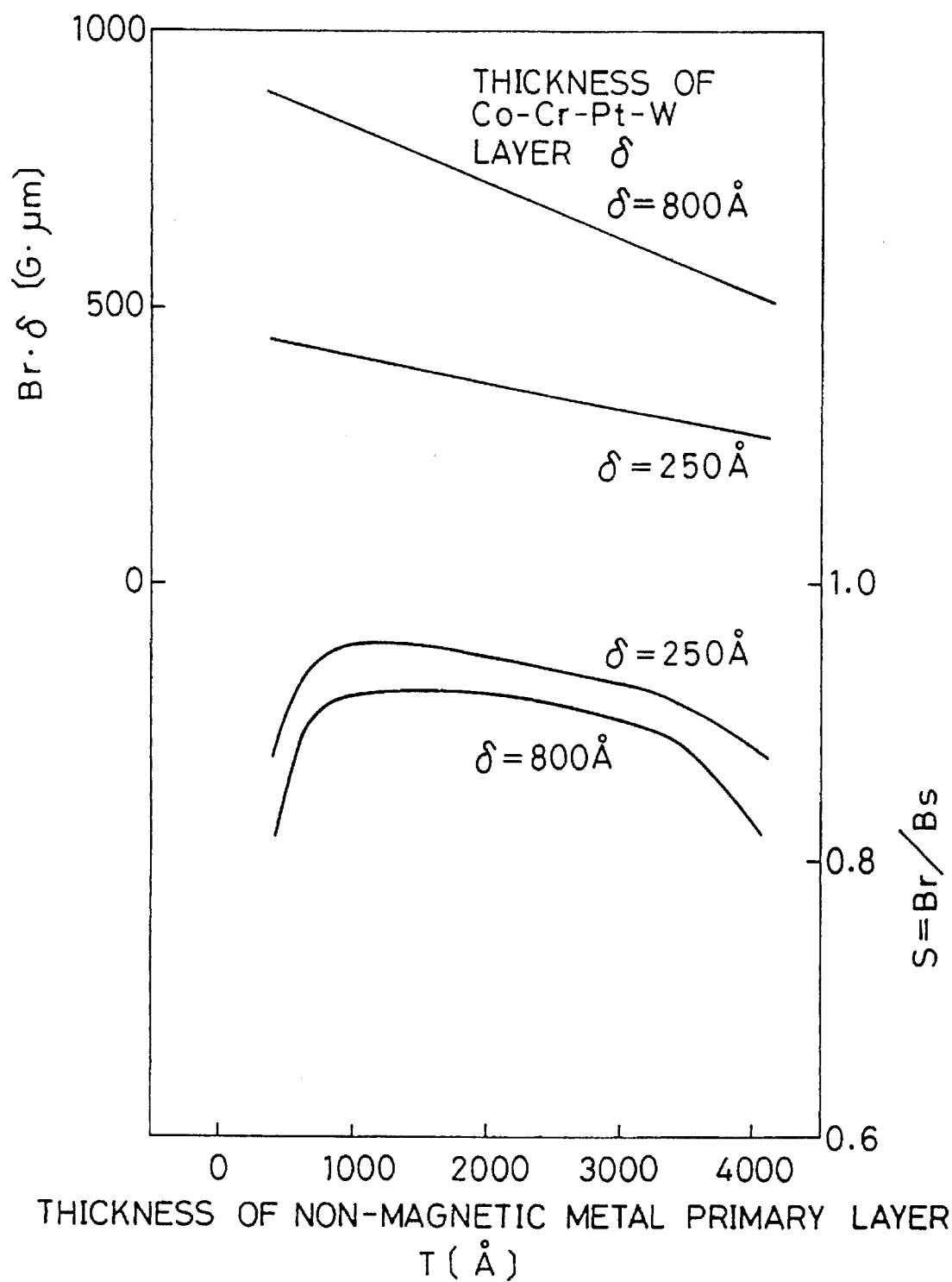
FIG. 12 is a diagram showing the relationship between the magnetic characteristics of the fourth example of the magnetic recording medium and the thickness of a non-magnetic metal primary layer using the thickness of the magnetic layer as a parameter.

FIG. 12 shows the magnetic characteristics of the magnetic recording media, produced by varying the thickness T of the Cr non-magnetic metal primary layer 2 and the thickness δ of the Co—Cr—Pt—W magnetic layer. The composition ratio of the Co—Cr—Pt—W magnetic layer used here is represented by Co:Cr:Pt:W=72.6:14.9:11.9:0.6. This composition corresponds to $(Co_{73}Cr_{15}Pt_{12})_{99.4}W_{0.6}$ which is like the composition having the maximum coercive force in FIG. 11. The value of the product of the residual flux density Br and the thickness δ of the magnetic layer tended to decrease monotonically with an increase of the thickness T of the Cr primary layer. When the thickness T of the Cr layer was not more than 3000 Å, and at the same time when the thickness δ of the Co—Cr—Pt—W layer was not less than 250 Å, a Br.δ value of higher than 300 G.μm as required for a high recording density design was obtained. On the other hand, the squareness ratio S was at a maximum when the thickness T of the Cr layer was around 1000 Å. Further, the squareness ratio S decreased with an increase of the thickness δ of the Co—Cr—Pt—W layer. When the thickness T of the Cr layer was in the range of 500 to 3000 Å, and at the same time when the thickness δ of the Co—Cr—Pt—W layer was in the range of 250 to 800 Å, a magnetic recording medium having a coercive force of higher than 1500 Oe and a squareness ratio of higher than 0.85 was obtained.

Figure 13:
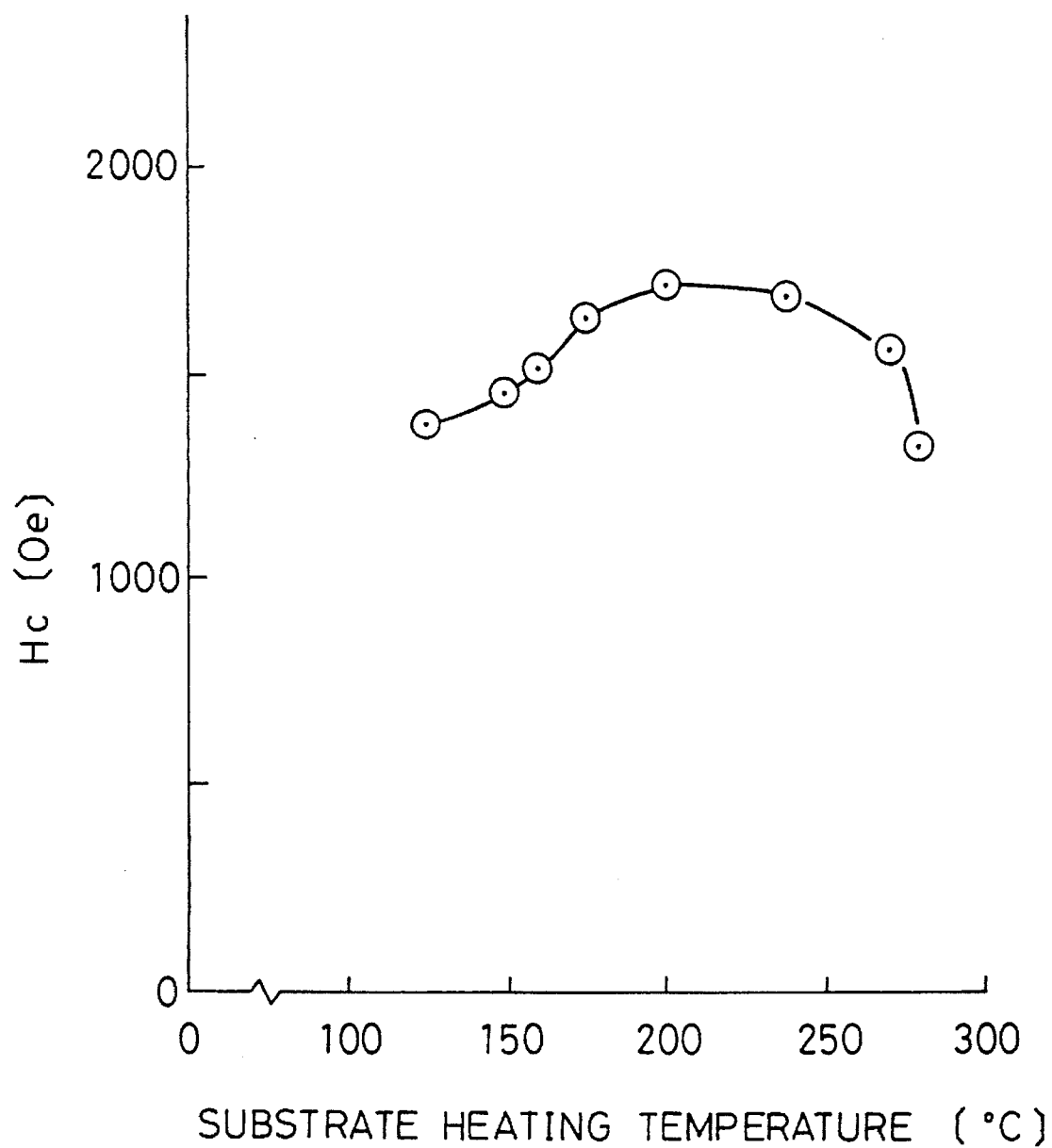
FIG. 13 is a diagram showing the relationship between the magnetic characteristics of the fourth example of the magnetic recording medium and the heating temperature of a substrate prior to a sputtering film formation process.

FIG. 13 shows variations in the coercive force when the temperature of heating of the substrate 1 prior to the sputtering film formation was changed. The thickness of the Cr primary layer 2 was 1500 Å, and the magnetic layer 31 was composed of 72.6 at % of Co, 14.9 at % of Cr, 11.9 at % of Pt and 0.6 at % of W, and the thickness of the magnetic layer 31 was 600 Å. The time of heating of the substrate 1 was 5 minutes. When heat treatment was carried out to provide substrate temperatures of 160° to 270° C., and then the film formation was carried out, a magnetic recording medium having a coercive force of higher than 1500 Oe was obtained.

EXAMPLE 5

Instead of adding Ta to the Co—Cr—Pt ternary alloy as in Example 2, Zr was added to the ternary alloy, and a magnetic layer 31 was made of Zr containing alloy. More specifically, using targets having Zr pieces of different areas embedded in an alloy composed of 73 at % of Co, 15 at % of Cr and 12 at % Of Pt, a magnetic layer whose composition was represented by $(Co_{73}Cr_{15}Pt_{12})_{100-x}Zr_x$ was formed on a Cr primary layer 2 by sputtering. Except for this step, magnetic recording media as shown in FIG. 2 were prepared according to the same procedure as Example 1 or Example 2.

Figure 14:
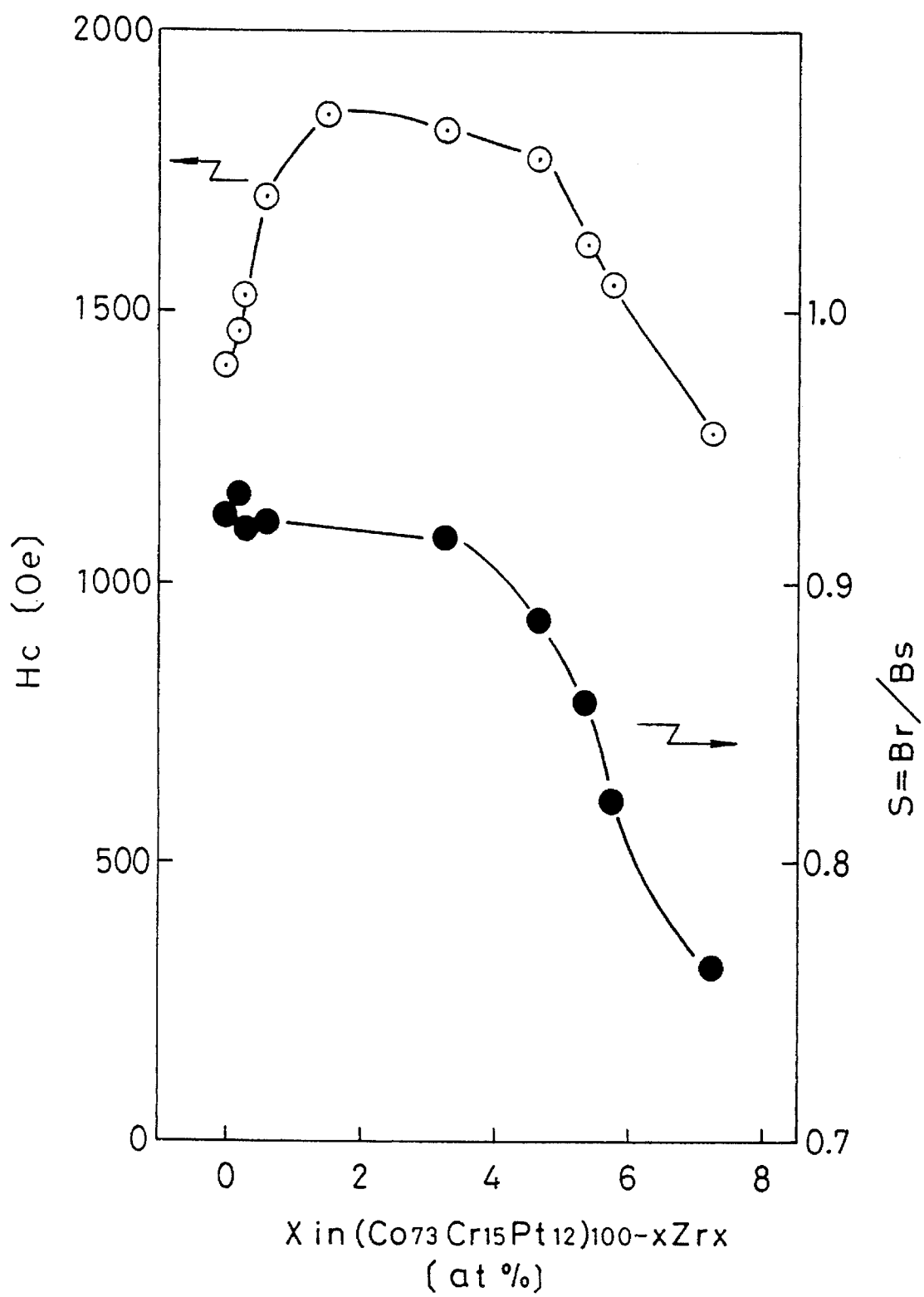
FIG. 14 is a diagram showing the relationship between the magnetic characteristics of a fifth example of the magnetic recording medium of the present invention and the zirconium content in a ferromagnetic alloy thin-film magnetic layer.

FIG. 14 shows the magnetic characteristics of the magnetic recording media, produced by varying the Zr content of the Co—Cr—Pt—Zr magnetic layer. FIG. 14 is a diagram showing the coercive force Hc and the squareness ratio S=Br/Bs, when the thickness of the Cr non-magnetic primary layer 2 was 1500 Å, and the thickness of the Co—Cr—Pt—Zr magnetic layer was 600 Å.

As the Zr content increased, the coercive force Hc was improved, and was at a maximum at 1.5 at % of Zr, and thereafter the coercive force decreased abruptly. On the other hand, the squareness ratio S tended to decrease monotonically with an increase of the Zr content. When the Zr content was in the range of 0.3 to 5.4 at %, a magnetic recording medium having a coercive force of higher than 1500 Oe and a squareness ratio of not less than 0.85 was obtained.

Figure 15:
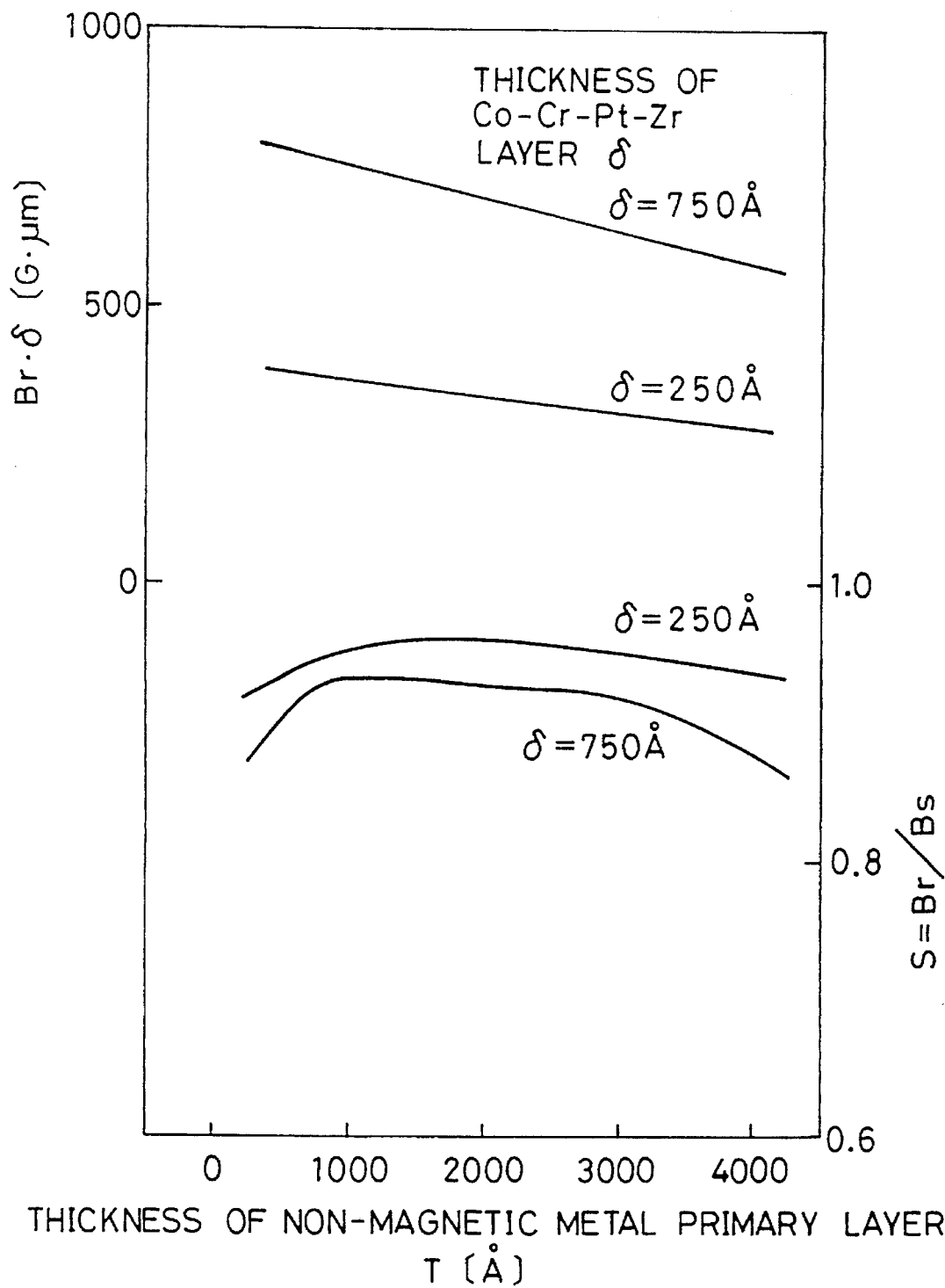
FIG. 15 is a diagram showing the relationship of the magnetic characteristics of the fifth example of the magnetic recording medium and the thickness of a non-magnetic metal primary layer using the thickness of the magnetic layer as a parameter.

FIG. 15 shows the magnetic characteristics of the magnetic recording media, produced by varying the thickness T of the Cr non-magnetic metal primary layer 2 and the thickness δ of the Co—Cr—Pt—Zr magnetic layer. The composition ratio of the Co—Cr—Pt—Zr magnetic layer used here is represented by Co:Cr:Pt:Zr=71.9:14.8:11.8:1.5. This composition corresponds to $(Co_{73}Cr_{15}Pt_{12})_{98.5}Zr_{1.5}$ which is like the composition having the maximum coercive force in FIG. 14. The value of the product of the residual flux density Br and the thickness δ of the magnetic layer tended to decrease monotonically with an increase of the thickness T of the Cr primary layer. When the thickness T of the Cr layer was not more than 2800 Å, and at the same time when the thickness δ of the Co—Cr—Pt—Zr layer was not less than 250 Å, a Br.δ value of higher than 300 G.μm was obtained. On the other hand, the squareness ratio S was at a maximum when the thickness T of the Cr layer was around 800 Å. Further, the squareness ratio S decreased with an increase of the thickness δ of the Co—Cr—Pt—Zr layer. When the thickness T of the Cr layer was in the range of 500 to 3500 Å, and at the same time when the thickness δ of the Co—Cr—Pt—Zr layer was in the range of 250 to 750 Å, a magnetic recording medium having a coercive force of higher than 1500 Oe and a squareness ratio of higher than 0.85 was obtained.

Figure 16:
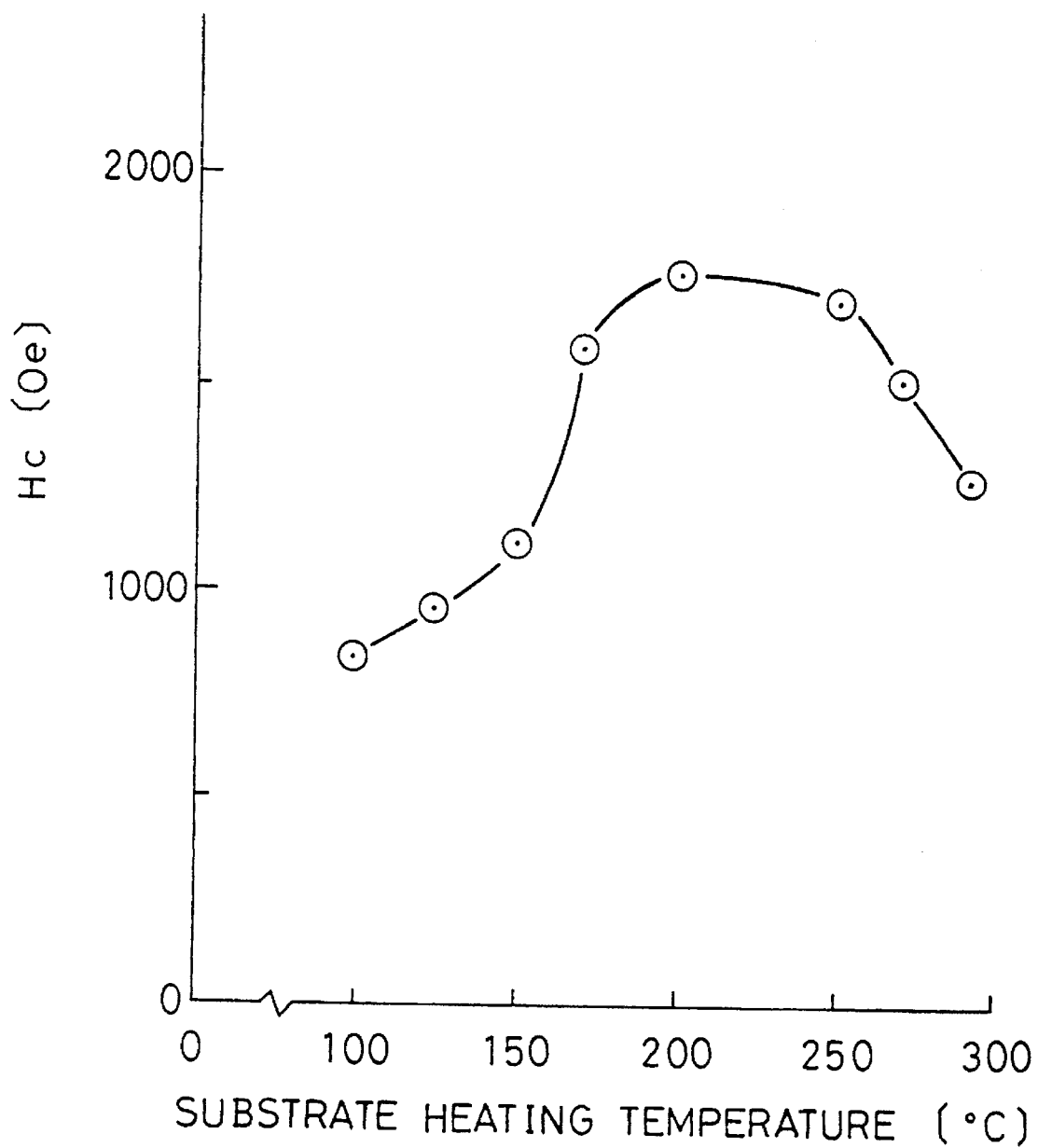
FIG. 16 is a diagram showing the relationship between the magnetic characteristics of the fifth example of the magnetic recording medium and the heating temperature of a substrate prior to a sputtering film formation process.

FIG. 16 shows variations in the coercive force when the temperature of heating of the substrate 1 prior to the sputtering film formation was changed. The thickness of the Cr primary layer 2 was 1500 Å, and the magnetic layer 31 was composed of 71.9 at % of Co, 14.8 at % of Cr, 11.8 at % of Pt and 1.5 at % of Zr, and the thickness of the magnetic layer 31 was 600 Å. The time of heating of the substrate 1 was 5 minutes. When heat treatment was carried out to provide substrate temperatures of 170° to 270° C., and then the film formation was carried out, a magnetic recording medium having a coercive force of 1500 or higher Oe was produced.

EXAMPLE 6

Instead of adding Ta to the Co—Cr—Pt ternary alloy as in Example 2, Nb was added to the ternary alloy, and a magnetic layer 31 was made of Nb containing alloy. More specifically, using targets having Nb pieces of different areas embedded in an alloy composed of 73 at % of Co, 15 at % of Cr and 12 at % of Pt, a magnetic layer whose composition was represented by $(Co_{73}Cr_{15}Pt_{12})_{100-x}Nb_x$ was formed on a Cr primary layer 2 by sputtering. Except for this step, magnetic recording media as shown in FIG. 2 were prepared according to the same procedure as Example 1 or Example 2.

Figure 17:
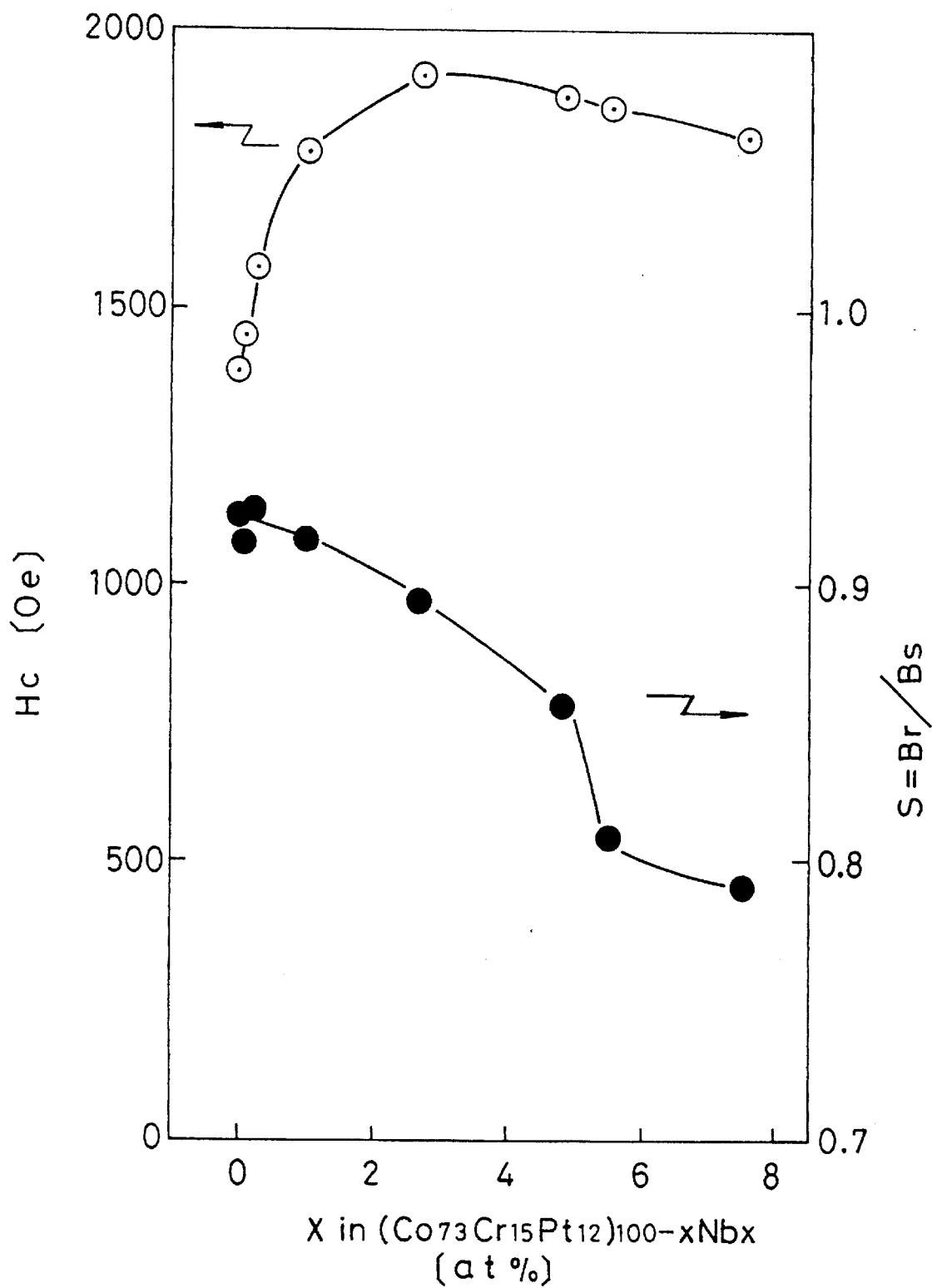
FIG. 17 is a diagram showing the relationship between the magnetic characteristics of a sixth example of the magnetic recording medium of the present invention and the niobium content in a ferromagnetic alloy thin-film magnetic layer.

FIG. 17 shows the magnetic characteristics of the magnetic recording media, produced by varying the Nb content of the Co—Cr—Pt—Nb magnetic layer. FIG. 17 is a diagram showing the coercive force Hc and the squareness ratio S=Br/Bs, when the thickness of the Cr non-magnetic primary layer 2 was 1500 Å, and the thickness of the Co—Cr—Pt—Nb magnetic layer was 600 Å.

As the Nb content increased, the coercive force Hc is improved, and was at a maximum at 2.7 at % of Nb, and thereafter the coercive force decreased. On the other hand, the squareness ratio S tended to decrease monotonically with an increase of the Nb content. When the Nb content was in the range of 0.25 to 4.8 at %, a magnetic recording medium having a coercive force of 1500 Oe or higher and a squareness ratio of 0.85 or higher was obtained.

Figure 18:
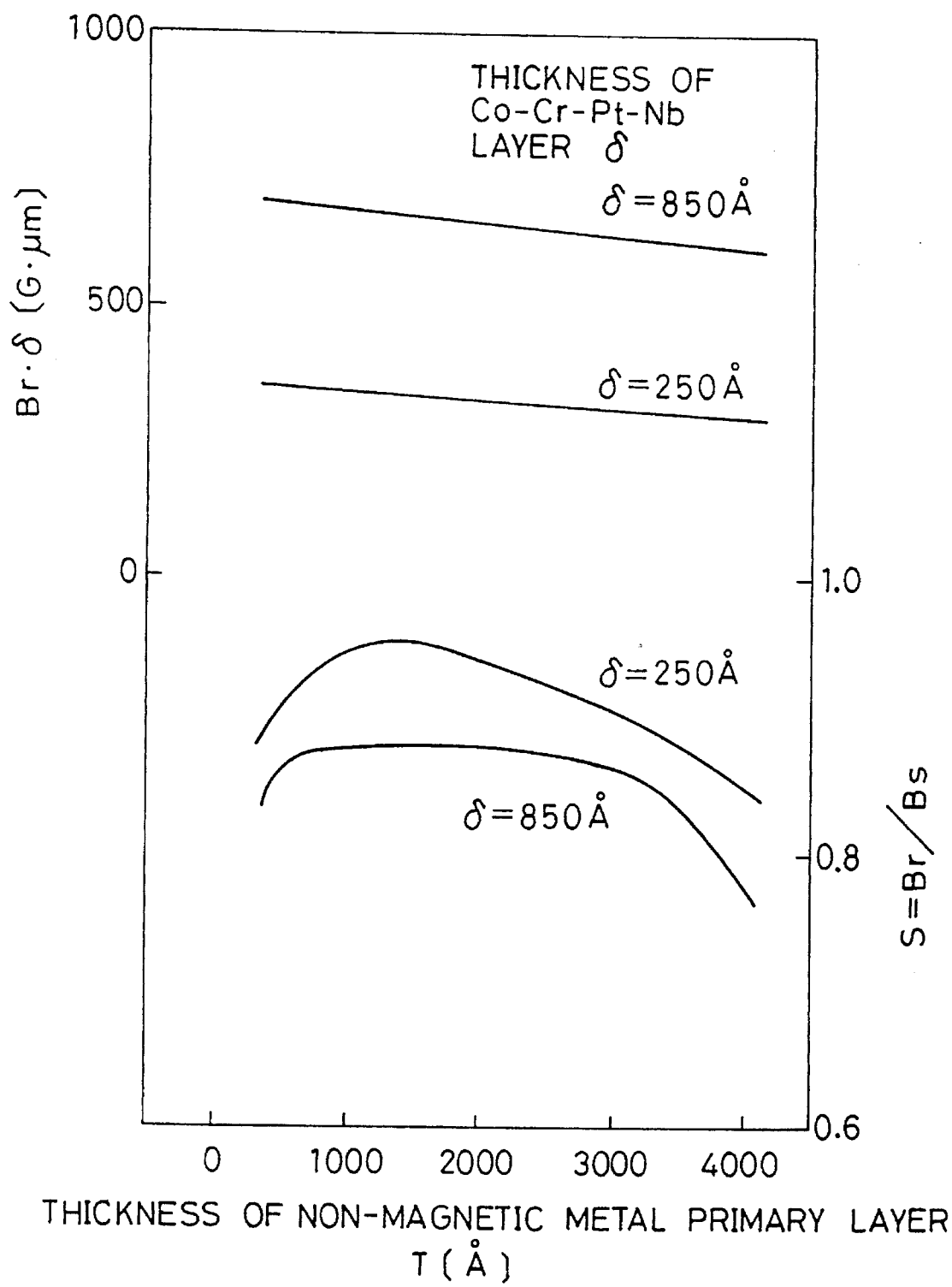
FIG. 18 is a diagram showing the relationship between the magnetic characteristics of the sixth example of the magnetic recording medium and the thickness of a non-magnetic metal primary layer using the thickness of the magnetic layer as a parameter.

FIG. 18 shows the magnetic characteristics of the magnetic recording media, produced by varying the thickness T of the Cr non-magnetic metal primary layer 2 and the thickness δ of the Co—Cr—Pt—Nb magnetic layer. The composition ratio of the Co—Cr—Pt—Nb magnetic layer used here is represented by Co:Cr:Pt:Nb=72.3:14.9:11.9:0.9. This composition corresponds to $(Co_{73}Cr_{15}Pt_{12})_{99.1}Nb_{0.9}$ which is like the composition having the maximum coercive force in FIG. 17. The value of the product of the residual flux density Br and the thickness δ of the magnetic layer tended to decrease monotonically with an increase of the thickness T of the Cr primary layer. When the thickness T of the Cr layer was not more than 3000 Å, and at the same time when the thickness δ of the Co—Cr—Pt—Nb layer was not less than 250 Å, a Br.δ value of higher than 300 G.μm was obtained. On the other hand, the squareness ratio S was at a maximum when the thickness T of the Cr layer was around 1000 Å. Further, the squareness ratio S decreased with an increase of the thickness δ of the Co—Cr—Pt—Nb layer. When the thickness T of the Cr layer was in the range of 500 to 3000 Å, and at the same time when the thickness δ of the Co—Cr—Pt—Nb layer was in the range of 250 to 850 Å, a magnetic recording medium having a coercive force of 1500 Oe or higher and a squareness ratio 0.85 or higher was obtained.

Figure 19:
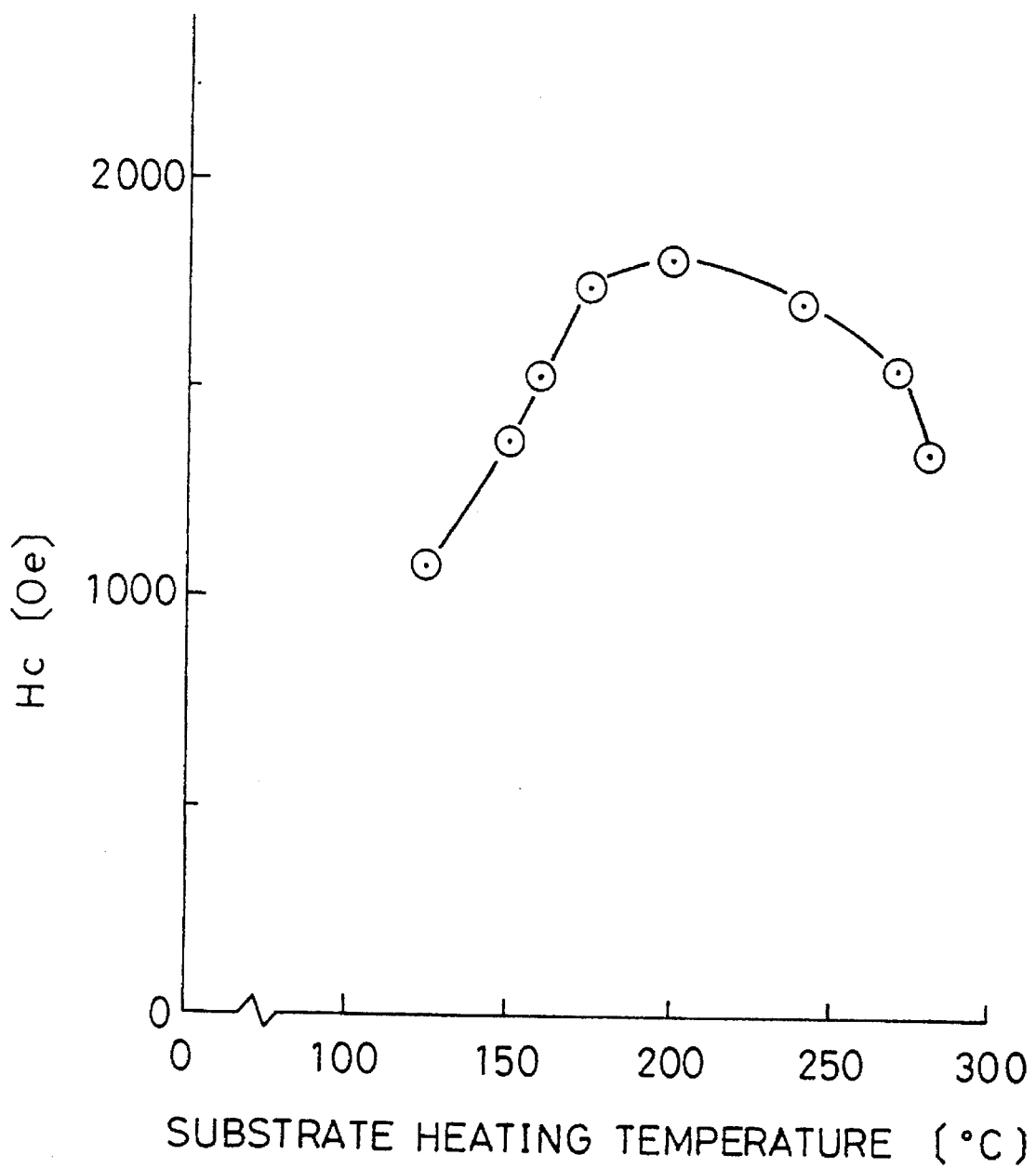
FIG. 19 is a diagram showing the relationship between the magnetic characteristics of the sixth example of the magnetic recording medium and the heating temperature of a substrate prior to a sputtering film formation process.

FIG. 19 shows variations in the coercive force when the temperature of heating of the substrate 1 prior to the sputtering film formation was changed. The thickness of the Cr primary layer 2 was 1500 Å, and the magnetic layer 31 was composed of 72.3 at % of Co, 14.9 at % of Cr, 11.9 at % of Pt and 0.9 at % of Nb, and the thickness of the magnetic layer 31 was 600 Å. The time of heating of the substrate 1 was 5 minutes. When heat treatment was carried out to provide substrate temperatures of 160° to 270° C., and then the film formation was carried out, a magnetic recording medium having a coercive force of higher than 1500 Oe was produced.

In the above-mentioned Examples 2 to 6, when the non-magnetic metal layer 2 was made of titanium, and when the protective layer was made of other material such for example as silicon dioxide, and when the protective layer was not provided, the magnetic characteristics were not changed. The time of heating the substrate prior to the film deposition may be changed within a range from 2 to 30 minutes.

Further, in Examples 2 to 6, although the composition of the Co—Cr—Pt ternary alloy to which Ta or another element is added is represented by $Co_{73}Cr_{15}Pt_{12}$, the composition ratio of Co:Cr:Pt is not limited to this value. Even if the contents of Co, Cr and Pt vary about ±3%, ±2% and ±3%, respectively, a magnetic recording medium having a coercive force of 1500 Oe or higher and a squareness ratio of 0.85 or higher can be obtained by the addition of Ta, Hf, W, Zr or Nb.

In the present invention, the crystal grains of the magnetic layer are very fine, and the axis of easy magnetization can easily be directed in the plane of the recording medium, and therefore there can be obtained a magnetic recording medium which has a high coercive force and a high squareness ratio suitable for a high recording density design.

Although the present invention has been described in the above Examples with respect to magnetic discs, a floppy disc or a magnetic tape can also be produced by sequentially forming the non-magnetic metal layer and the above-mentioned magnetic alloy layer on a flexible substrate by sputtering.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A magnetic recording medium, comprising:

a non-magnetic substrate;

a non-magnetic metal primary layer formed on said substrate, said non-magnetic metal primary layer being made of chromium and having a thickness of 500 to 3400 Å;

a thin film ferromagnetic alloy layer formed on said primary layer and made of an alloy composed of not more than 15 at % of chromium, not more than 12 at % of platinum, 0.3 to 4.7 at % of hafnium, and the balance cobalt, said ferromagnetic alloy layer having a thickness of 250 to 800 Å, a coercive force of not less than 1500 Oe, and a squareness ratio of not less than 0.85; and a protective layer formed on said ferromagnetic alloy layer.

2. The magnetic recording medium of claim 1, wherein said ferromagnetic alloy layer has a peak value of the coercive force in the content range of hafnium from 0.3 to 4.7 at %.

3. The magnetic recording medium of claim 1, wherein the content of hafnium is within a range higher than 1.1 at % and less than 3.3 at % and the coercive force of said ferromagnetic alloy layer is higher than 1800 Oe.

4. A magnetic recording medium, comprising:

a non-magnetic substrate;

a non-magnetic metal primary layer formed on said substrate, said non-magnetic metal primary layer being made of chromium and having a thickness of 500 to 3000 Å;

a thin film ferromagnetic alloy layer formed on said primary layer and made of an alloy composed of not more than 15 at % of chromium, not more than 12 at % of platinum, 0.15 to 3.5 at % of tungsten, and the balance cobalt, said ferromagnetic alloy layer having a thickness of 250 to 800 Å, a coercive force of not less than 1500 Oe, and a squareness ratio of not less than 0.85; and a protective layer formed on said ferromagnetic alloy layer.

5. The magnetic recording medium of claim 4, wherein said ferromagnetic alloy layer has a peak value of the coercive force in the content range of tungsten from 0.15 to 3.5 at %.

6. A magnetic recording medium, comprising:

a non-magnetic substrate;

a non-magnetic metal primary layer formed on said substrate, said non-magnetic metal primary layer being made of chromium and having a thickness of 500 to 3500 Å;

a thin ferromagnetic alloy layer formed on said primary layer and made of an alloy composed of not more than 15 at % of chromium, not more than 12 at % of platinum, 0.3 to 5.4 at % of zirconium, and the balance cobalt, said ferromagnetic alloy layer having a thickness of 250 to 750 Å, a coercive force of not less than 1500 Oe, and a squareness ratio of not less than 0.85; and a protective layer formed on said ferromagnetic alloy layer.

7. The magnetic recording medium of claim 6, wherein said ferromagnetic alloy layer has a peak value of the coercive force in the content range of zirconium from 0.3 to 5.4 at %.

8. The magnetic recording medium of claim 6, wherein the content of zirconium is within a range higher than 1.0 at % and less than 4.1 at % and the coercive force of said ferromagnetic alloy layer is higher than 1800 Oe.

9. A magnetic recording medium, comprising:

a non-magnetic substrate;

a non-magnetic metal primary layer formed on said substrate, said non-magnetic metal primary layer being made of chromium and having a thickness of 500 to 3000 Å;

a thin film ferromagnetic alloy layer formed on said primary layer and made of an alloy composed of not more than 15 at % of chromium, not more than 12 at % of platinum, 0.25 to 4.8 at % of niobium, and the balance cobalt, said ferromagnetic alloy layer having a thickness of 250 to 850 Å, a coercive force of not less than 1500 Oe, and a squareness ratio of not less than 0.85; and a protective layer formed on said ferromagnetic alloy layer.

10. The magnetic recording medium of claim 9, wherein said ferromagnetic alloy layer has a peak value of the coercive force in the content range of niobium from 0.25 to 4.8 at %.

11. The magnetic recording medium of claim 9, wherein the content of niobium is within a range higher than 1.0 at % and less than 4.8 at % and the coercive force of said ferromagnetic alloy layer is higher than 1800 Oe.

* * * * *